(12) United States Patent
Gonzalez et al.

(10) Patent No.: US 11,437,841 B2
(45) Date of Patent: Sep. 6, 2022

(54) CONTROLLER WITH INDUCTIVE CHARGING AND SLIDEABLE PORTIONS

(71) Applicant: Bensussen Deutsch & Associates, LLC, Woodinville, WA (US)

(72) Inventors: Ulises Gonzalez, Woodinville, WA (US); Jason Biheller, Malibu, CA (US); Eric Bensussen, Woodinville, WA (US)

(73) Assignee: Bensussen Deutsch & Associates, LLC, Woodinville, WA (US)

( * ) Notice: Subject to any disclaimer, the term of this patent is extended or adjusted under 35 U.S.C. 154(b) by 499 days.

(21) Appl. No.: 16/436,792

(22) Filed: Jun. 10, 2019

(65) Prior Publication Data

US 2019/0379231 A1    Dec. 12, 2019

Related U.S. Application Data

(60) Provisional application No. 62/683,593, filed on Jun. 11, 2018.

(51) Int. Cl.
*H01M 10/46* (2006.01)
*H02J 7/02* (2016.01)
(Continued)

(52) U.S. Cl.
CPC .............. *H02J 7/025* (2013.01); *A63F 13/98* (2014.09); *H02J 7/0044* (2013.01); *H02J 50/005* (2020.01); *H02J 50/10* (2016.02)

(58) Field of Classification Search
CPC ...... H02J 7/0044; H02J 7/0042; H02J 50/005; H02J 50/10; A63F 13/98
(Continued)

(56) References Cited

U.S. PATENT DOCUMENTS 6,809,724 B1 * 10/2004 Shiraishi ................ G06F 1/163
345/157
7,833,097 B1 11/2010 Maddox et al.
(Continued)

FOREIGN PATENT DOCUMENTS

| DE | 20 2014 104 649 U1 | 11/2014 |
|----|---------------------|---------|
| EP | 2 579 522 A1 | 4/2013 |
| EP | 2 777 786 A2 | 9/2014 |

OTHER PUBLICATIONS

Anonymous, "Moga Pro Power and Hero Power review: Bluetooth controllers with a twist." Reviews (https://www.androidauthority.com/moga-pro-power-review-hero-power-320552/), Nov. 27, 2013, 12 pages. Retrieved on Aug. 8, 2019.
(Continued)

*Primary Examiner* — Edward Tso
(74) *Attorney, Agent, or Firm* — Seed IP Law Group LLP

(57) ABSTRACT

An inductive charging device can take the form of a game controller that is communicably coupled to a mobile device having a power source and has a retracted configuration and an extended configuration. The game controller can include a first control portion having one or more game controller inputs, a second control portion have one or more game controller inputs, and a charging unit coupleable to the first control portion and the second control portion. The charging unit can have a region that is sized and shaped to receive the mobile device, and an inductive charging apparatus, the inductive charging apparatus can be operable to selectively inductively charge the power source of the mobile device when the mobile device is received in the region.

21 Claims, 20 Drawing Sheets

(51) Int. Cl.
   *A63F 13/98*     (2014.01)
   *H02J 7/00*      (2006.01)
   *H02J 50/00*     (2016.01)
   *H02J 50/10*     (2016.01)

(58) Field of Classification Search
   USPC .............................. 320/107, 108, 114, 115
   See application file for complete search history.

(56) References Cited

U.S. PATENT DOCUMENTS

| | | | |
|---|---|---|---|
| 10,951,043 B2* | 3/2021 | Behzadi | ............... G06F 3/0482 |
| 2004/0137983 A1 | 7/2004 | Kerr et al. | |
| 2013/0324035 A1 | 12/2013 | Strommen | |
| 2016/0001176 A1 | 1/2016 | Chen | |

OTHER PUBLICATIONS

International Search Report and Written Opinion for PCT/US2019/036561, dated Sep. 18, 2019, 14 pages.

* cited by examiner

CONTROLLER WITH INDUCTIVE CHARGING AND SLIDEABLE PORTIONS

BACKGROUND

Technical Field

The present disclosure is directed to inductive charging devices and, more particularly, to inductive charging devices disposed in a game controller.

Description of the Related Art

Mobile devices are widely used for playing video games. Several video game developers have made available games especially suitable for playing on mobile devices, such as smart phones, tablets, etc. Using touch screens or mobile device keys, however, may be unsuitable and may present challenges for effectively playing such games. Therefore, video game controllers may be used to play video games on mobile devices. The video game controllers may be connected to the mobile devices via a wireless connection or a wired connection.

When video games are played on mobile devices, a significant strain is placed on the batteries that power the mobile devices. The strain on the batteries is further exacerbated when the mobile device is connected to the game controllers. Thus, it is desirable to provide devices, systems, and methods that restore, replenish, or otherwise improve charge level of the batteries.

BRIEF SUMMARY

The various embodiments and/or implementations described herein provide inductive charging devices that allow for users to secure their mobile devices and play video games, while restoring, replenishing, or otherwise improving charge level of the batteries of the mobile devices. For example, one non-limiting, example embodiment of an inductive charging device in the form of a game controller that is communicably coupled to a mobile device having a power source, the game controller having a retracted configuration and an extended configuration, may be summarized as including a first control portion having one or more game controller inputs, a second control portion have one or more game controller inputs, and a charging unit coupleable to the first control portion and the second control portion. The charging unit may have a region that is sized and shaped to receive the mobile device, and an inductive charging apparatus, the inductive charging apparatus operable to selectively inductively charge the power source of the mobile device when the mobile device is received in the region.

In another example, non-limiting example embodiment, a charging unit that is coupleable to a game controller and operable to selectively charge a battery of a mobile device coupled to the game controller, may be summarized as including a housing compartment, a first rail extending outwardly from the housing compartment, the first rail sized and shaped to couple to the game controller, a second rail extending outwardly from the housing compartment, the second rail sized and shaped to couple to the game controller, and an inductive charging apparatus received in the housing compartment. The inductive charging apparatus may be operable to selectively inductively charge the battery of the mobile device when the mobile device is positioned proximal to the inductive charging apparatus.

DETAILED DESCRIPTION

Figure 1:
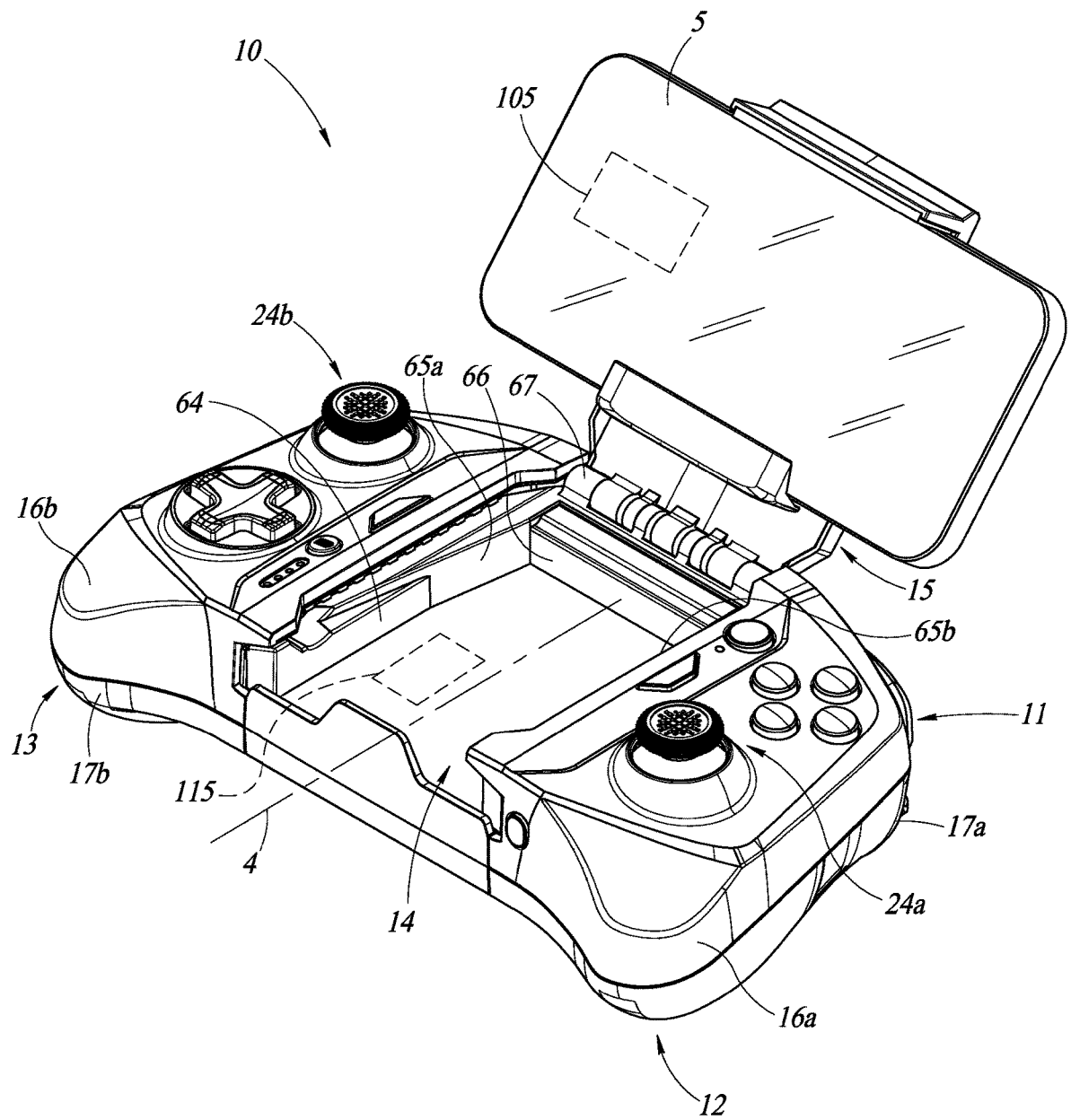
FIG. 1 is an isometric view of an inductive charging device, according to one example, non-limiting embodiment, in the form of a game controller, illustrating the game controller in a retracted configuration.
Figure 2:
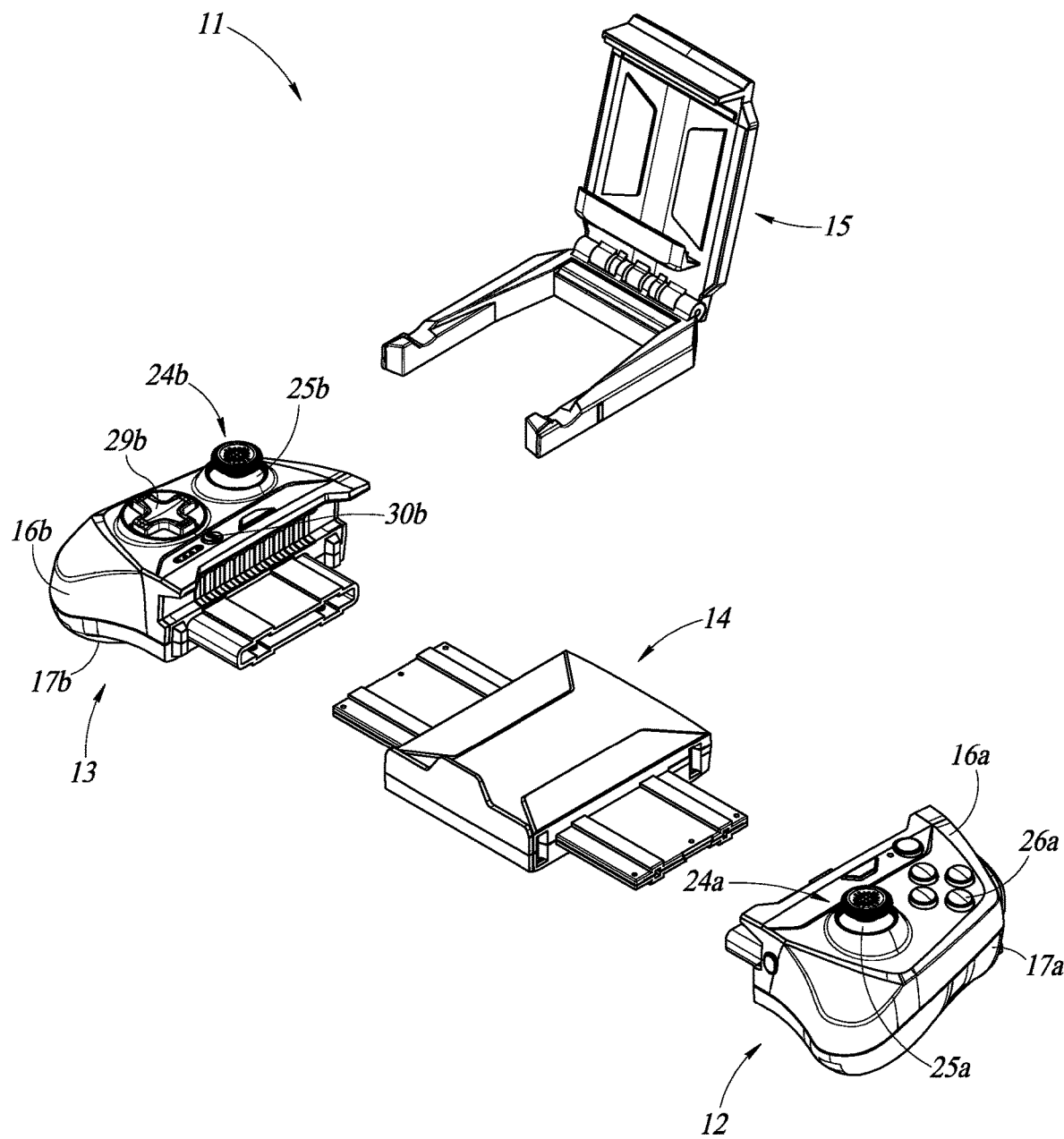
FIG. 2 is a high-level exploded view of the game controller of FIG. 1.
Figure 3A:
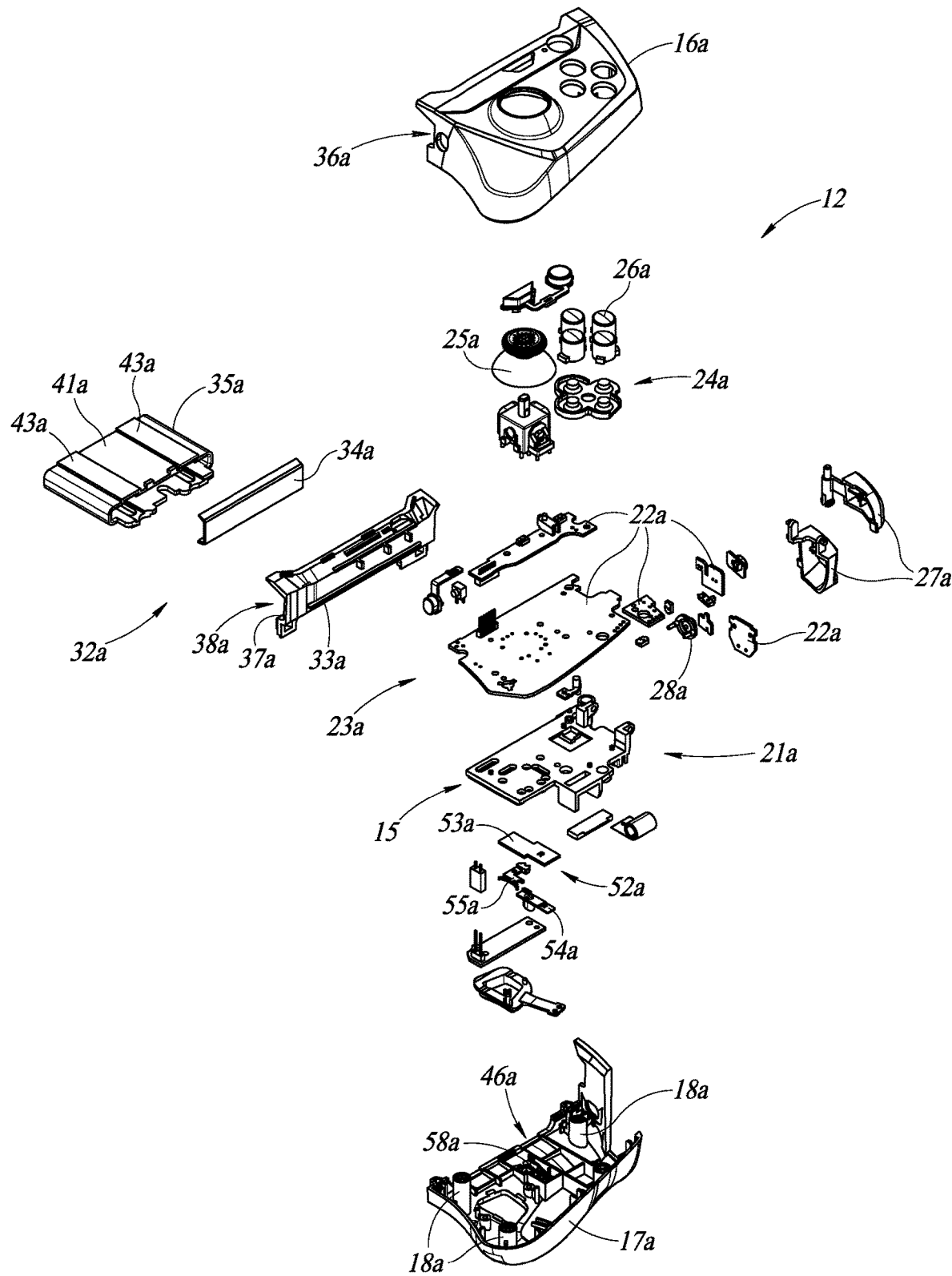
FIG. 3A is an exploded view of a first control portion of the game controller of FIG. 1.
Figure 3B:
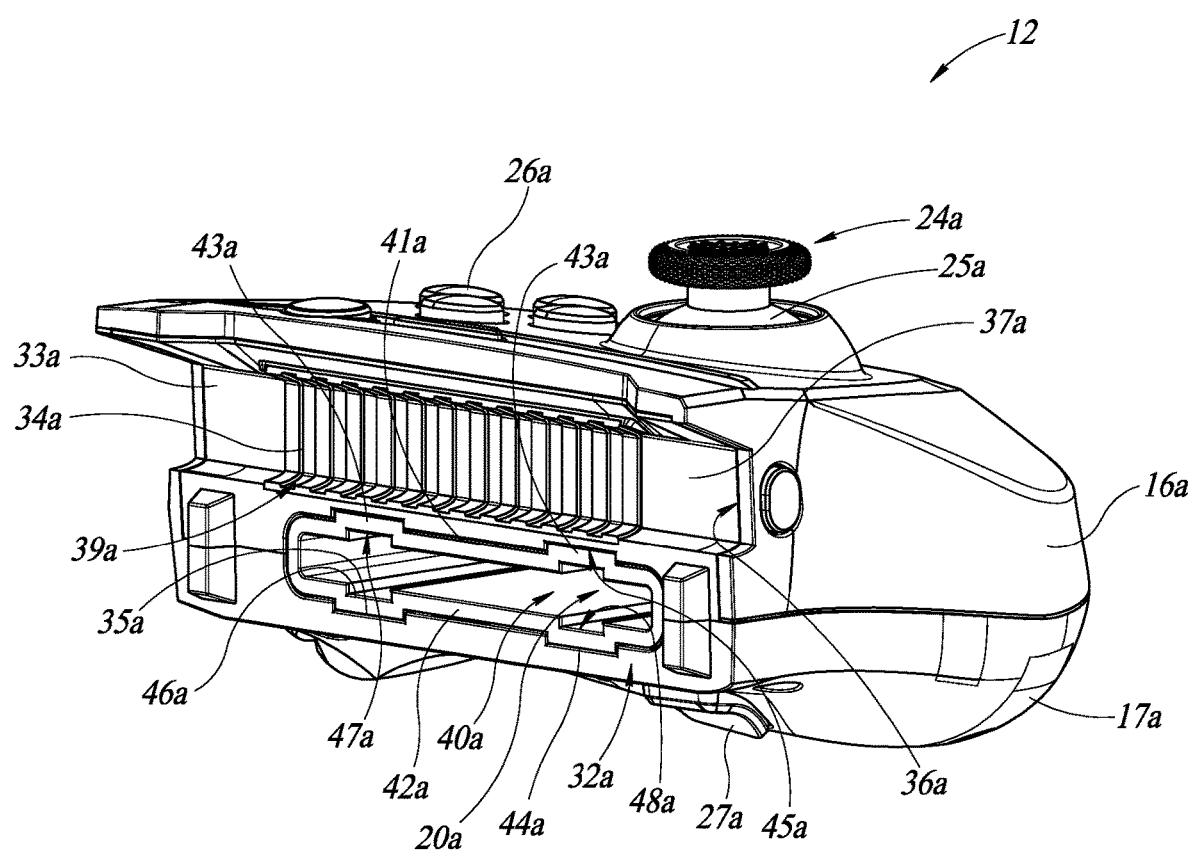
FIG. 3B is a skewed isometric view of the first control portion of the game controller of FIG. 1.
Figure 3C:
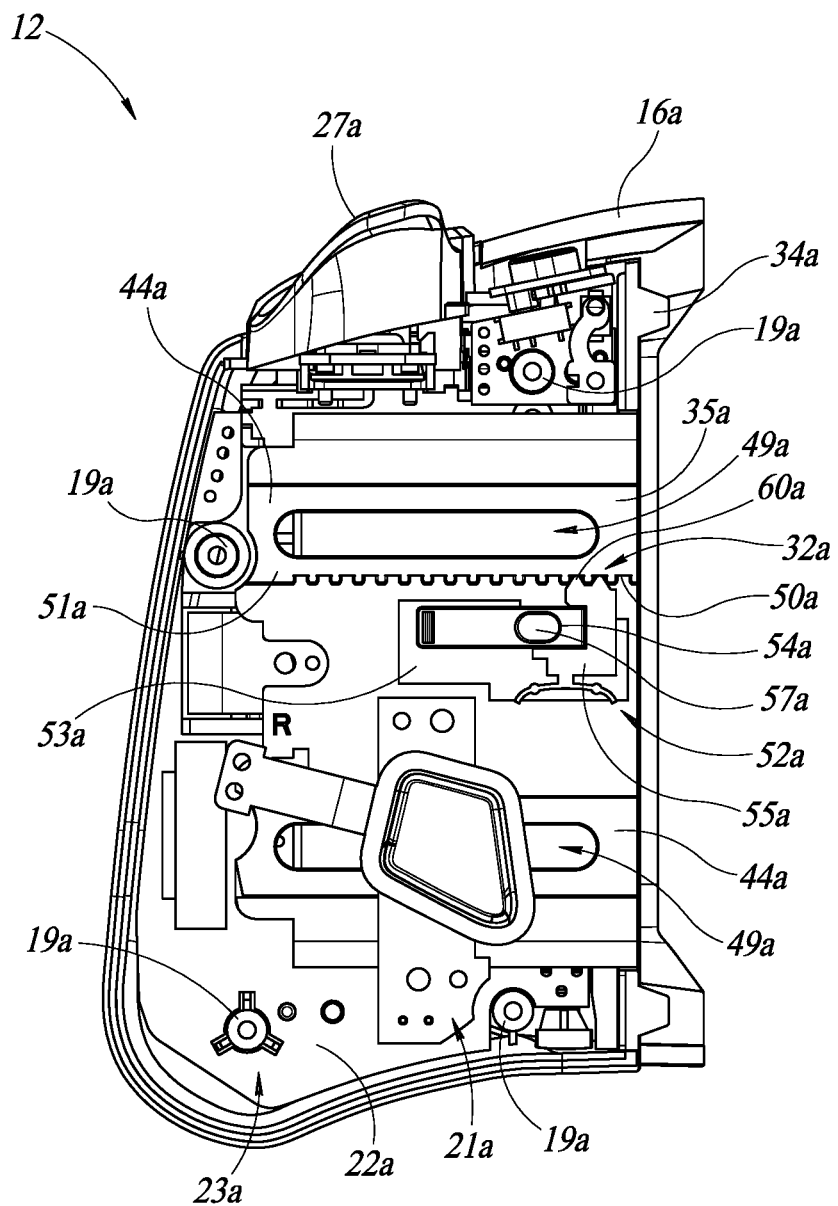
FIG. 3C is a partial rear view of the first control portion of the game controller of FIG. 1 with the lower housing removed for clarity of description and illustration.
Figure 3D:
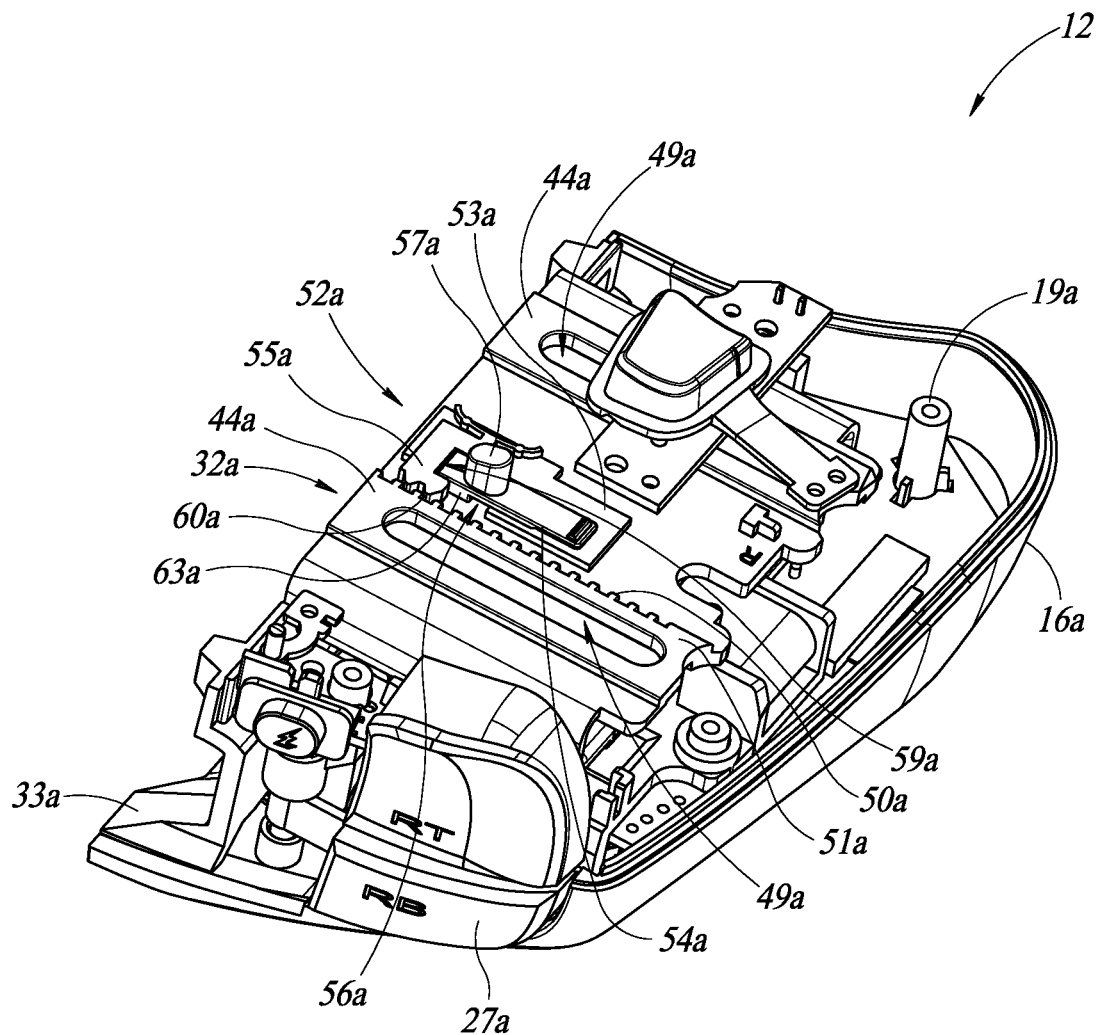
FIG. 3D is a skewed partial isometric view of the first control portion of the game controller of FIG. 1 with the lower housing removed for clarity of description and illustration.
Figure 4A:
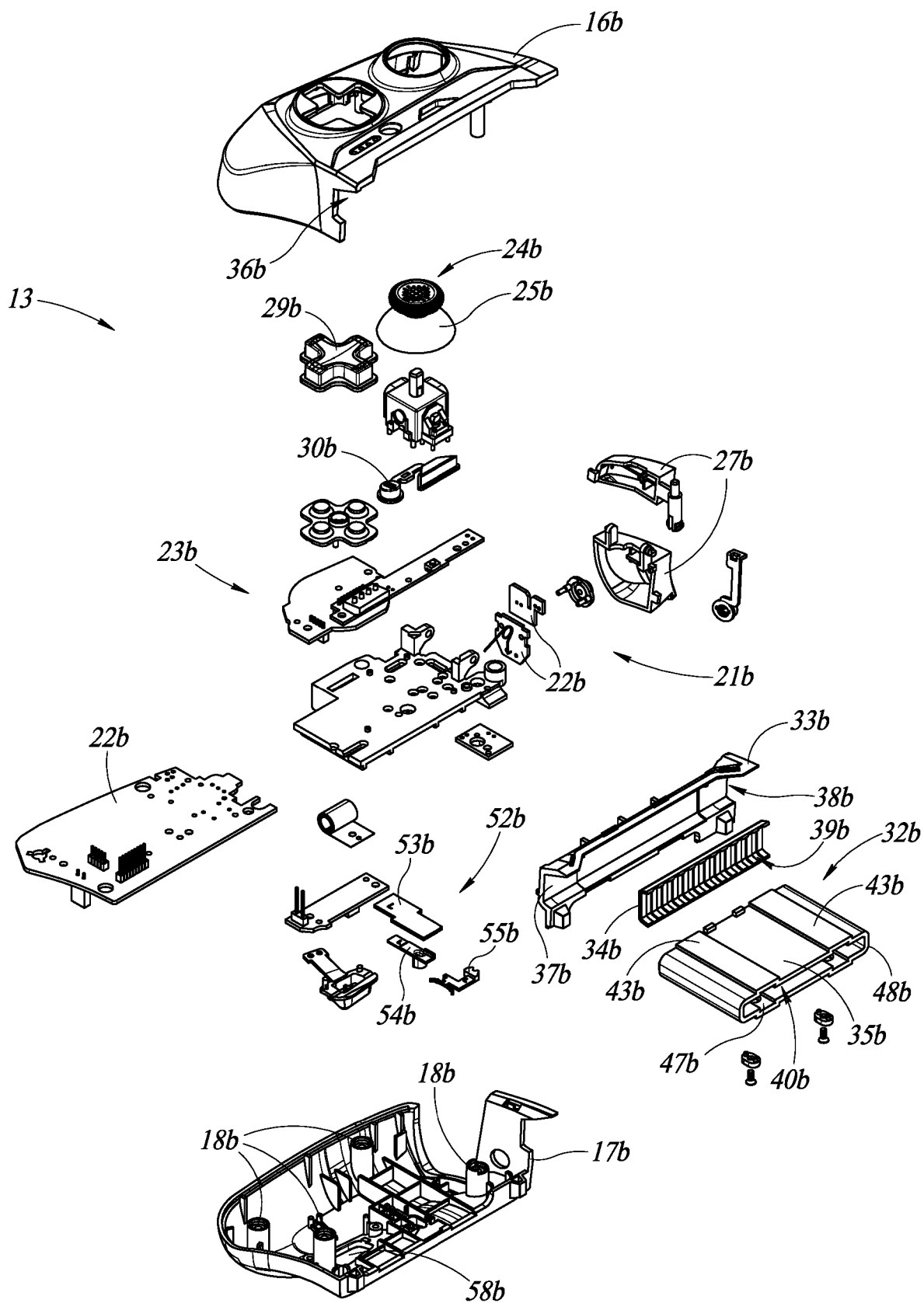
FIG. 4A is an exploded view of a second control portion of the game controller of FIG. 1.
Figure 4B:
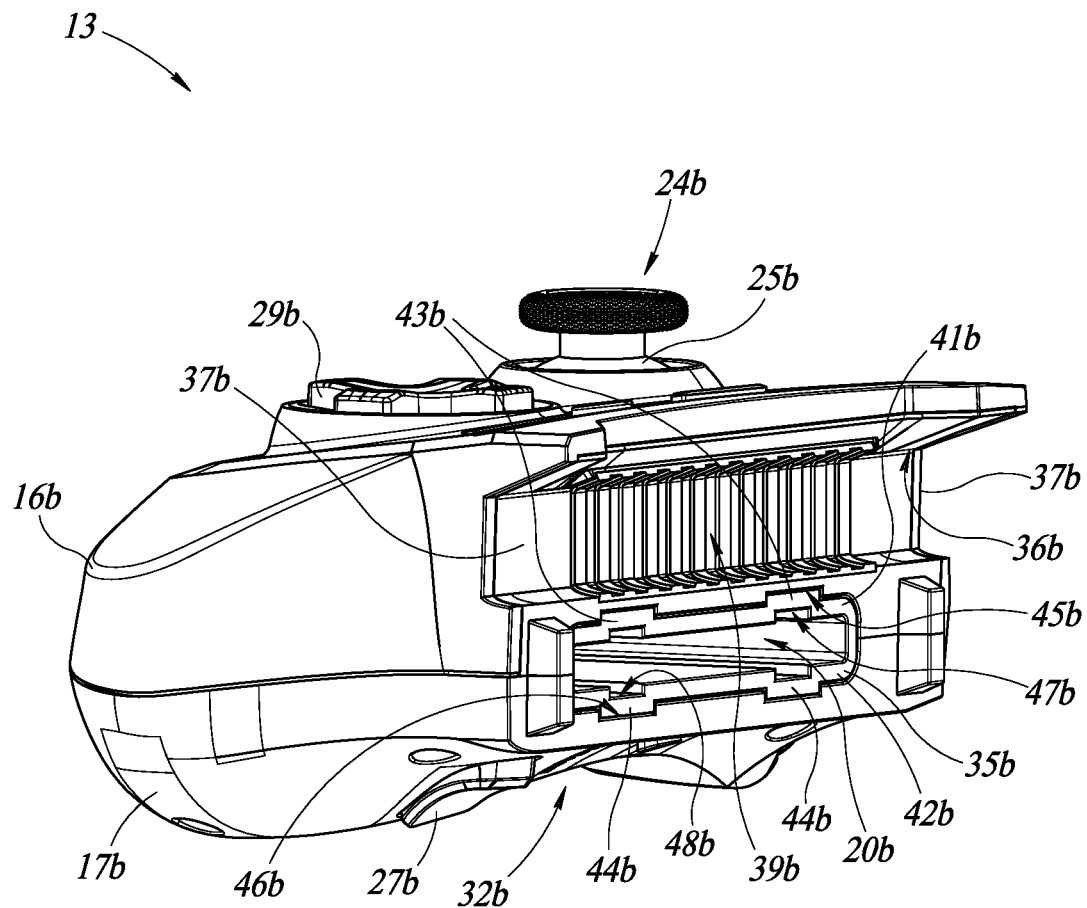
FIG. 4B is a skewed isometric view of the second control portion of the game controller of FIG. 1.
Figure 4C:
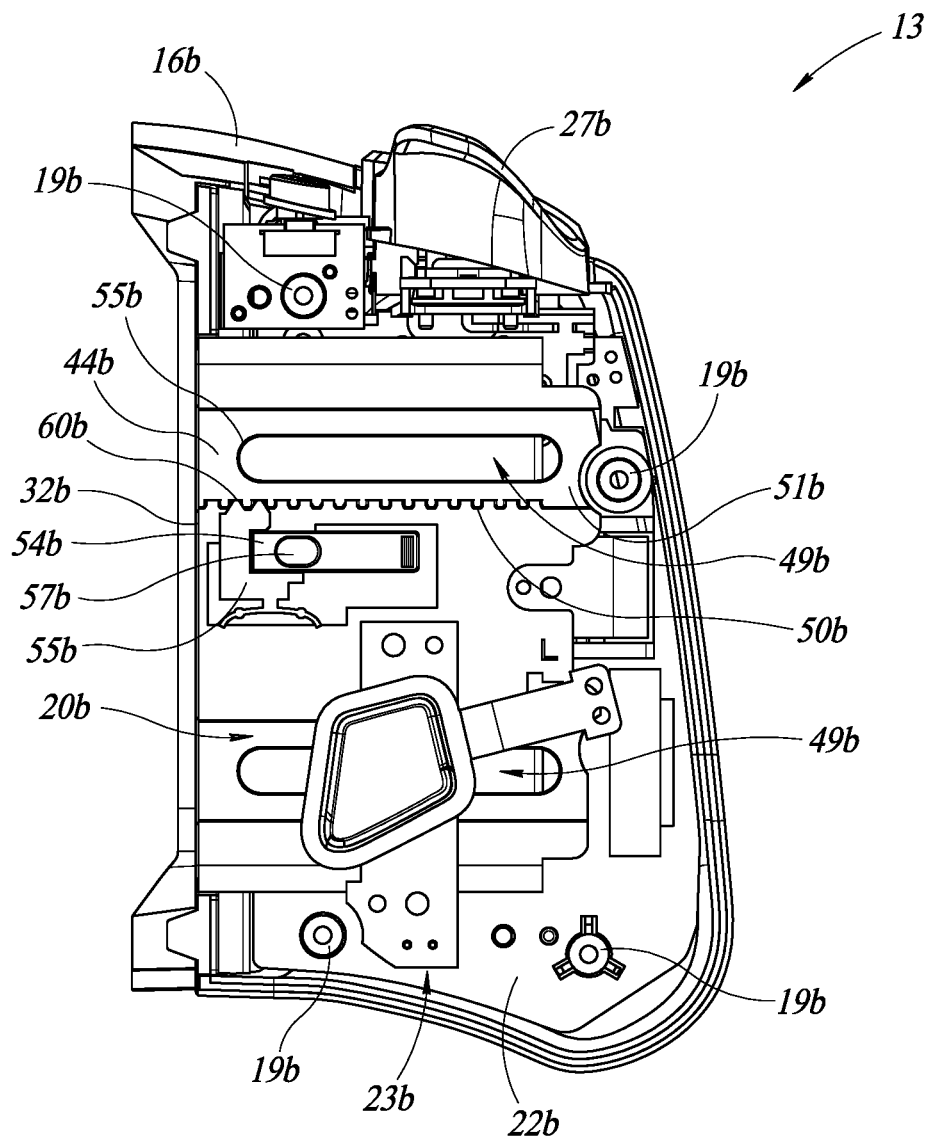
FIG. 4C is a partial rear view of the second control portion of the game controller of FIG. 1 with the lower housing removed for clarity of description and illustration.
Figure 4D:
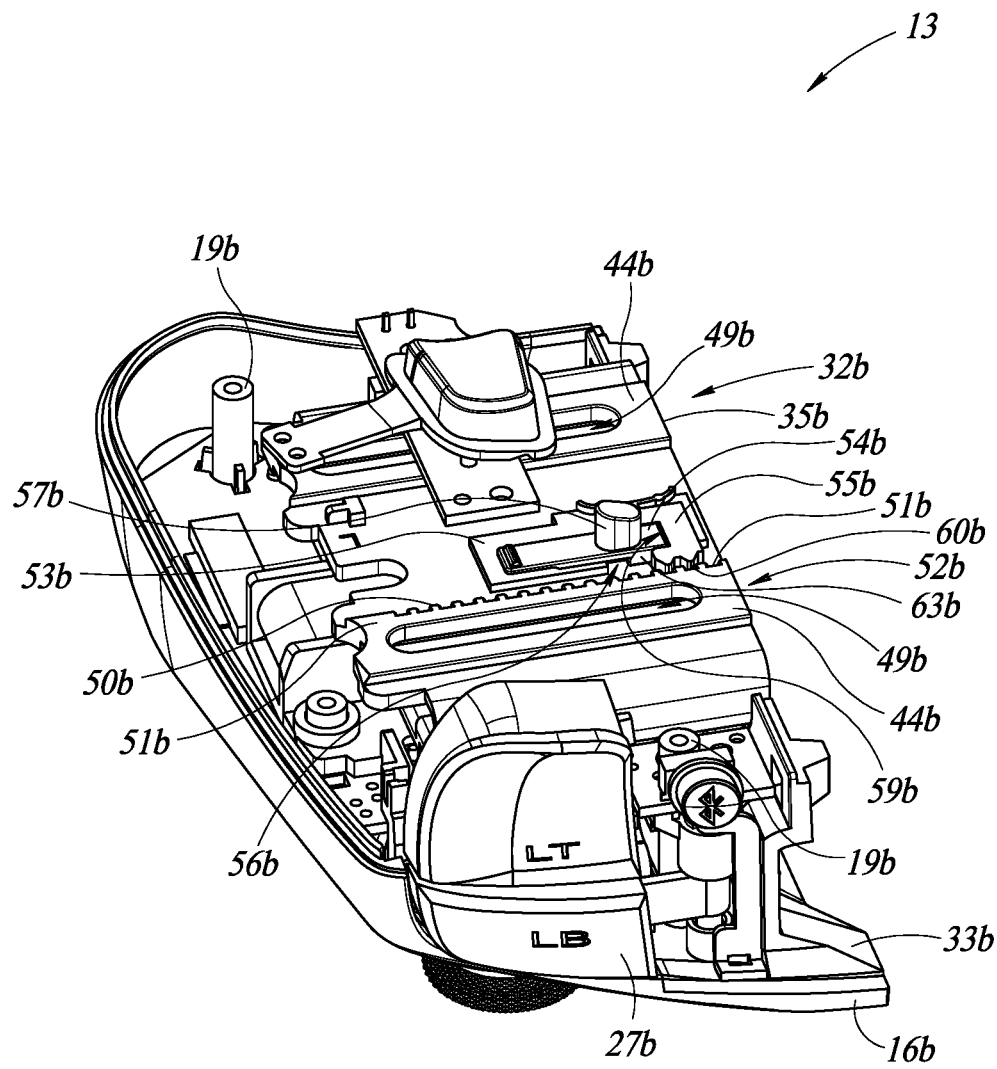
FIG. 4D is a skewed partial isometric view of the second control portion of the game controller of FIG. 1 with the lower housing removed for clarity of description and illustration.
Figure 5A:
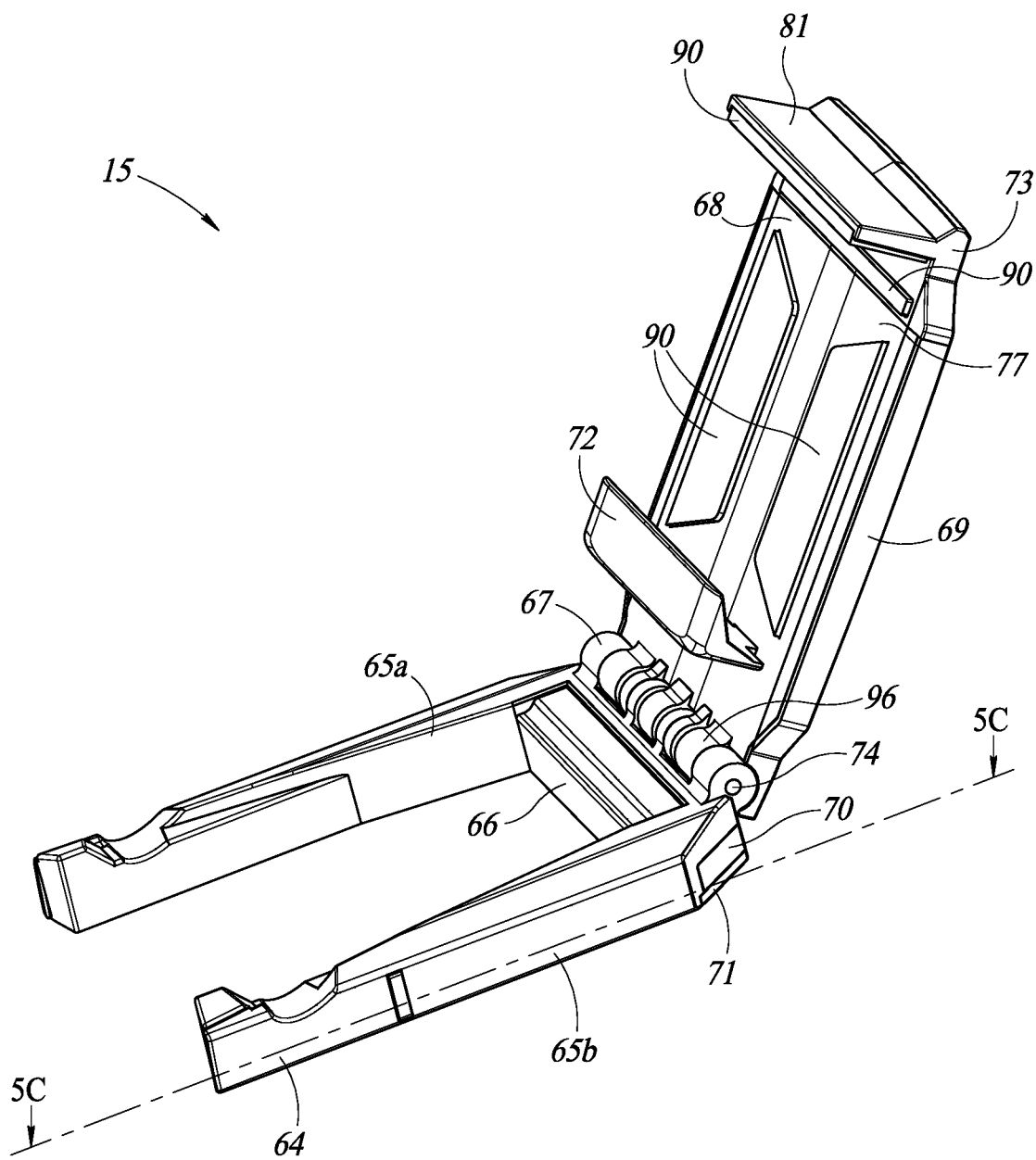
FIG. 5A is an isometric view of a stand assembly of the game controller of FIG. 1.
Figure 5B:
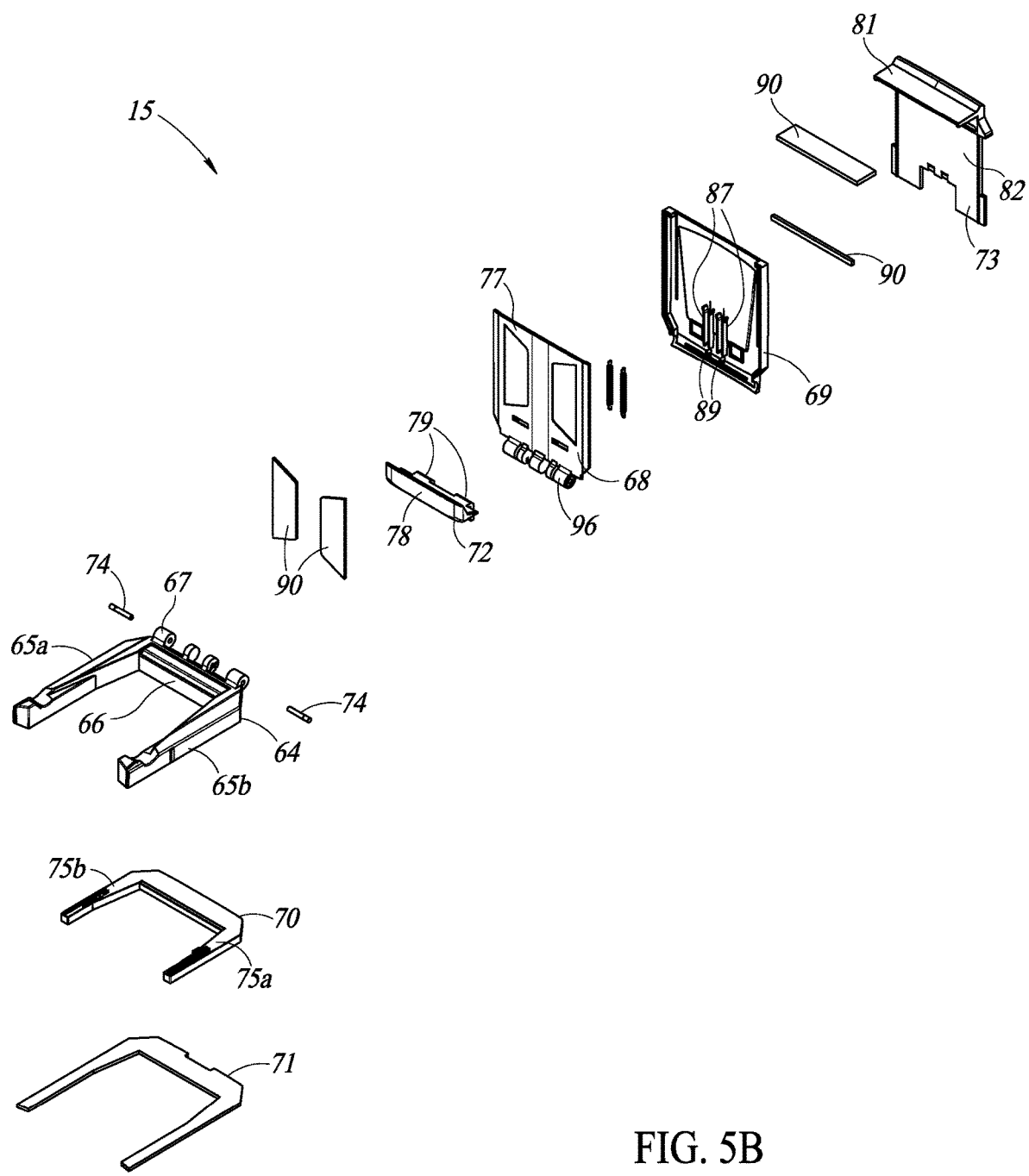
FIG. 5B is an exploded view of the stand assembly of the game controller of FIG. 1.
Figure 5C:
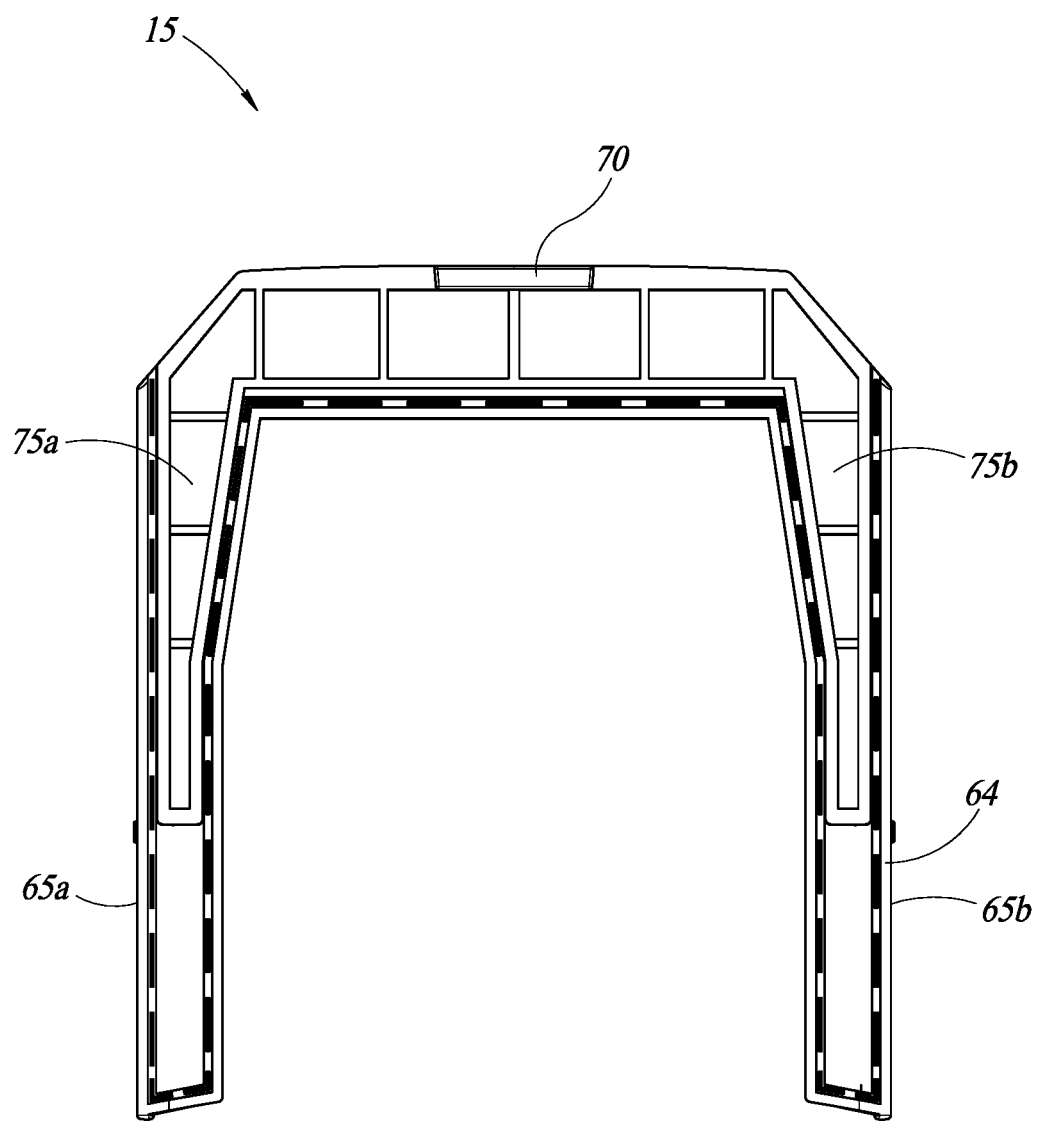
FIG. 5C is a cross-sectional view of the stand assembly of the game controller of FIG. 1, taken along line 5C-5C.
Figure 5D:
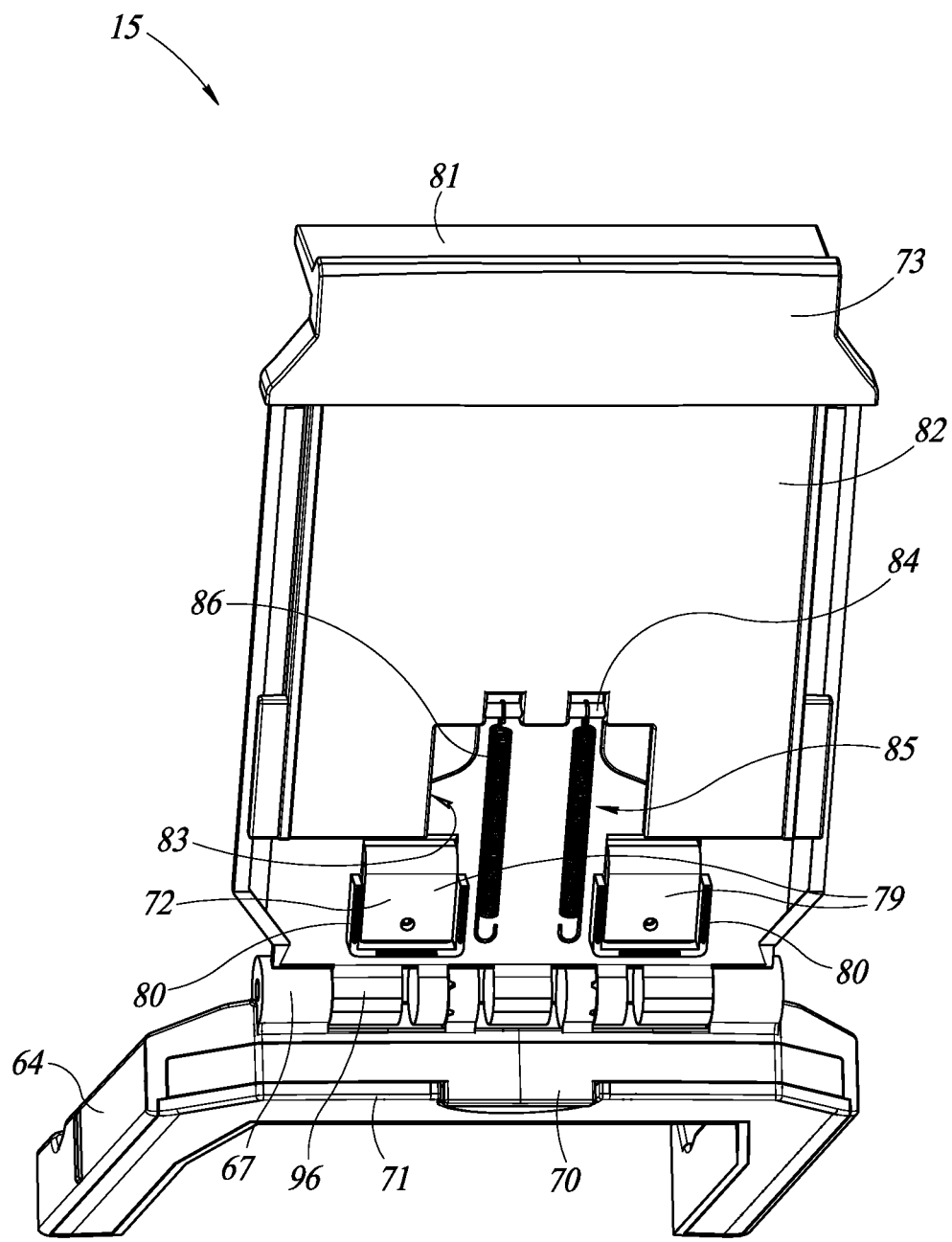
FIG. 5D is a skewed partial isometric view of the stand assembly of the game controller of FIG. 1, with certain components, e.g., an outer cover plate, removed for clarity of illustration and description.
Figure 6:
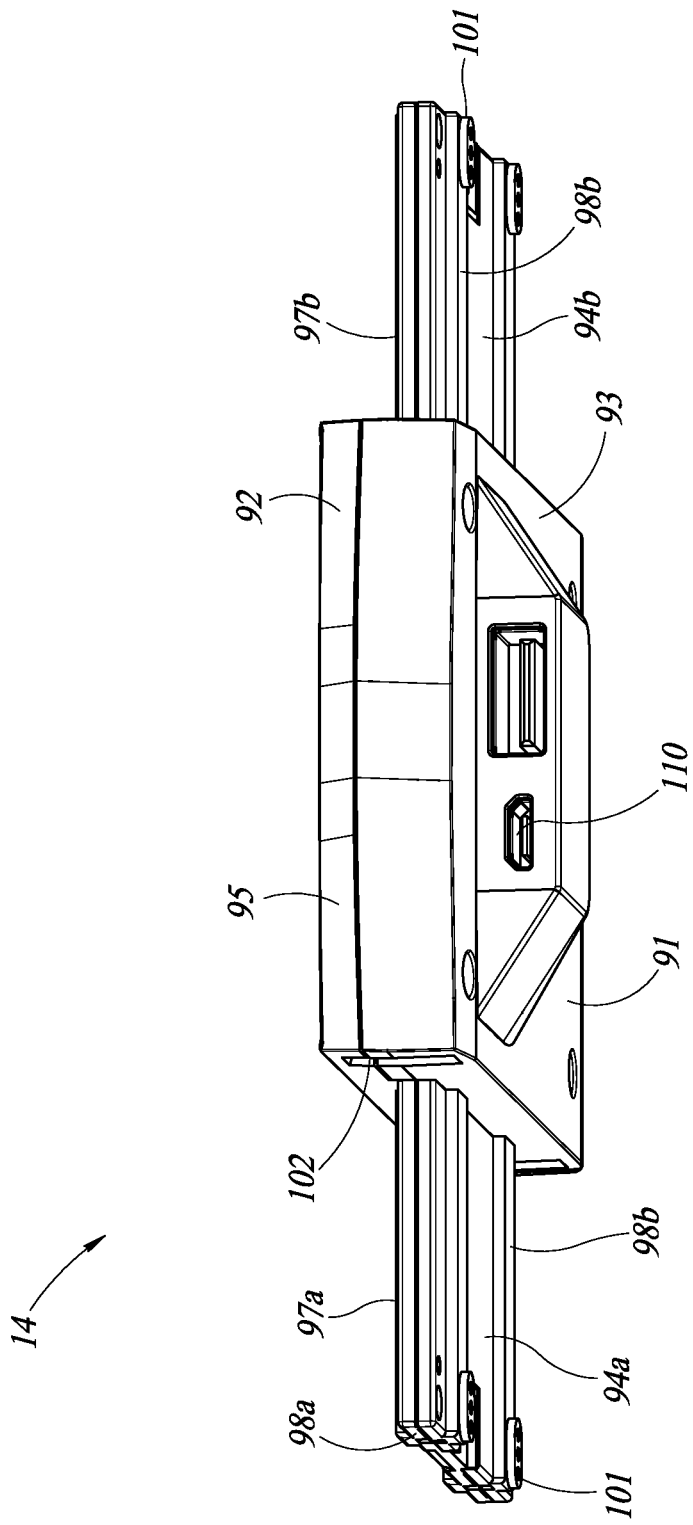
FIG. 6 is a skewed isometric view of a charging unit of the game controller of FIG. 1.
Figure 7:
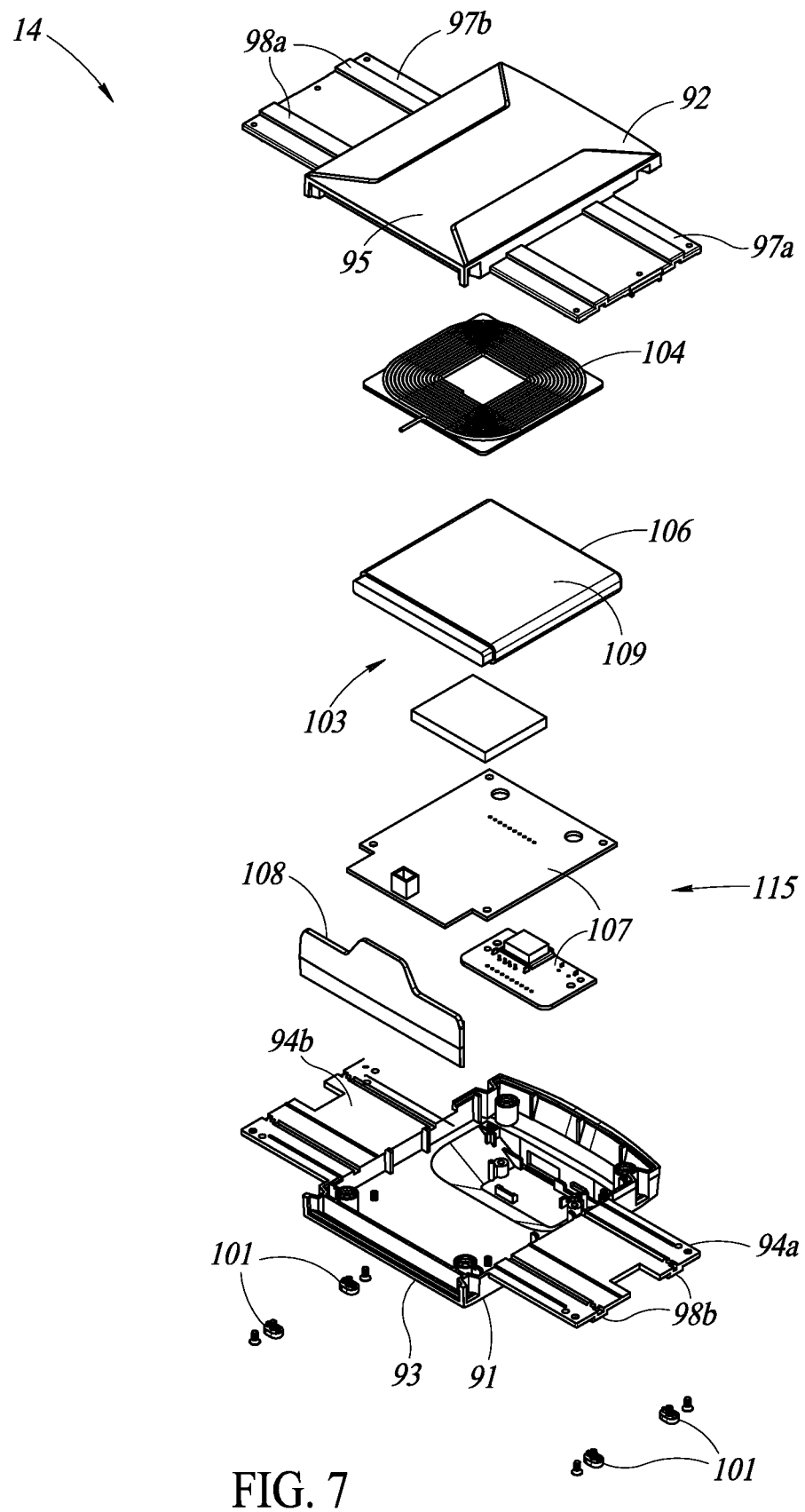
FIG. 7 is an exploded view of the charging unit of the game controller of FIG. 1.
Figure 8:
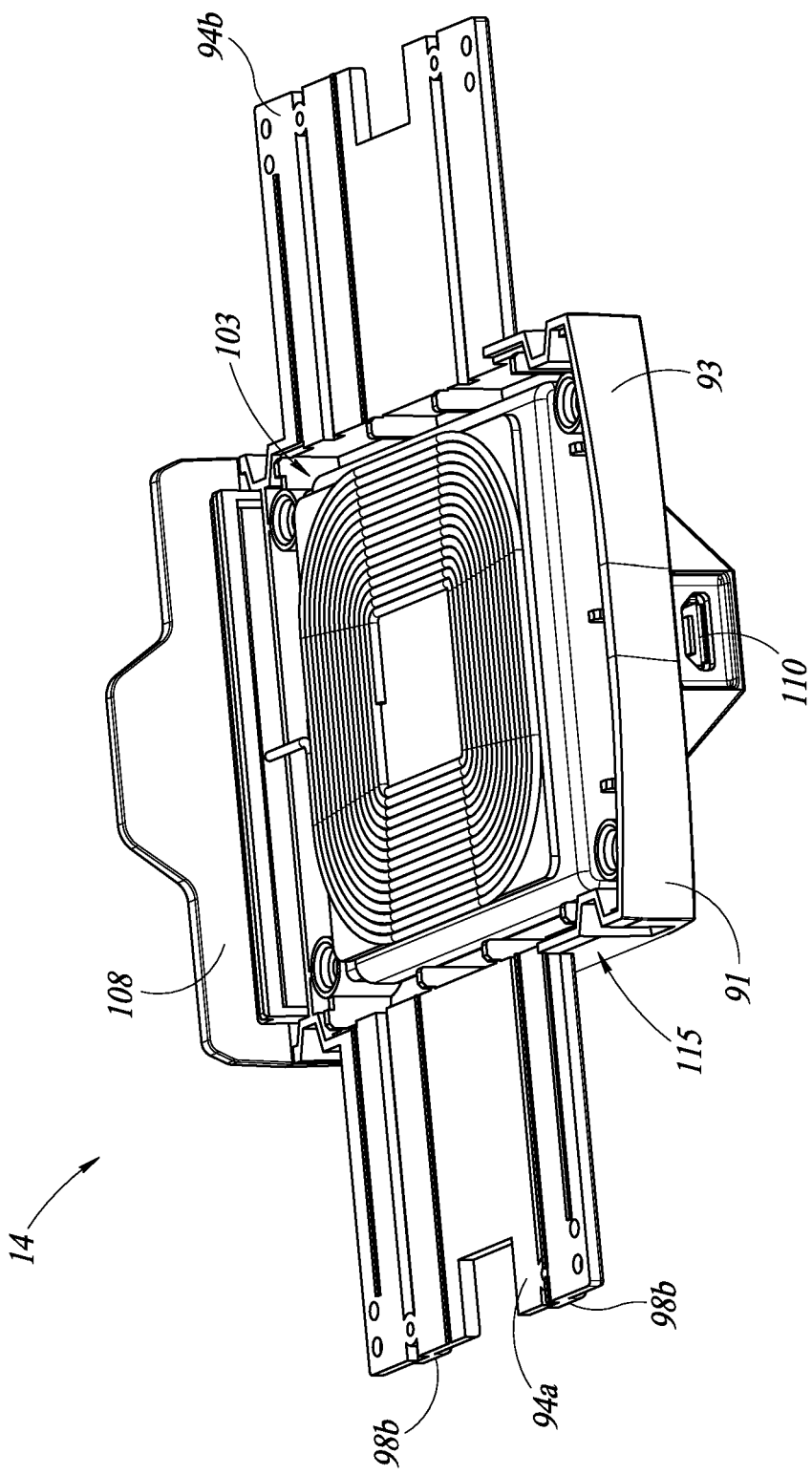
FIG. 8 is a partial isometric view of the charging unit of the game controller of FIG. 1, with certain components, e.g., upper compartment, removed for clarity of illustration and description.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with video game consoles, controllers, mobile devices, and communications systems and structures and networks have not been shown or described in detail to avoid unnecessarily obscuring descriptions of the implementations.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the implementations.

FIGS. 1-11 illustrate an inductive charging device 10 in the form of a game controller 11 according to one example, non-limiting embodiment, although other forms of inductive charging devices, in lieu of game controllers, are within the scope of the disclosed subject matter. For example, in some embodiments, the inductive charging device 10 may take the form of a video game console, etc. The game controller 11 generally is sized, shaped, and operable to removably, coupleably receive a mobile device 5. The game controller 11 includes a first control portion 12, a second control portion 13, a charging unit 14, and a stand assembly 15. The first control portion 12 is generally a mirror image of the second control portion 13. The first control portion 12 includes an upper housing 16a and a lower housing 17a that is coupled to the upper housing 16a. For example, the lower housing 17a includes one or more posts 18a that are sized and shaped to couple to one or more receiving protrusions 19a disposed in the upper housing 16a. The upper and lower housings 16a, 17a, when coupled together provide a first housing cavity 20a that is sized and shaped to receive various components of the first control portion 12.

The first control portion 12 includes electrical circuitry 21a, for example, mounted on one or more printed circuit boards (PCBs) 22a, one or more switches, one or more diodes, etc., that form a system 23a of the game controller 11 that cooperates with similar circuitry of the second control portion 13 to activate control function. In particular, activating of the control function is generally operable to control an on-screen function, such as navigation, jump, sprint, switch screens, etc. of a video game being played on a mobile device 5. The first control portion 12 includes one or more game controller inputs 24a, for example joystick 25a, control buttons 26a, triggers 27a, power button 28a, program button, etc. While some game controller inputs 24a are demonstrated in FIGS. 1-3D and 9-11, in some embodiments, one or more additional game controller inputs 24a known in the art can be incorporated in the first control portion 12, or omitted from the ones demonstrated in FIGS. 1-3D and 9-11.

The electrical circuitry 21a includes one or more communications modules (e.g., Bluetooth™, WI-FI, IEEE 802.11 compliant protocols) to facilitate communication of the game controller 11 with the mobile device 5. For example, the one or more communications channels may, for instance, include a communication network, which may be a wired connection, a Wi-Fi network, WiMAX, Zigbee, Z-Wave, Bluetooth™, Bluetooth™ Low Energy, near-field communication, or any other type of connection capable of providing uni-directional or bi-directional communication between the game controller 11 and the mobile device 5.

As described above the second control portion 13 is generally similar to the first control portion 12. The second control portion 13 includes an upper housing 16b and a lower housing 17b that is coupled to the upper housing 16b. For example, the lower housing 17b includes one or more posts 18b that are sized and shaped to couple to one or more receiving protrusions 19b disposed in the upper housing 16b. The upper and lower housings 16b, 17b, when coupled together provide a second housing cavity 20b that is sized and shaped to receive various components of the second control portion 13. The second control portion 13 includes electrical circuitry 21b, for example, mounted on one or more printed circuit boards (PCBs) 22b, one or more switches, one or more diodes, etc., that form a system 23b of the game controller 11 that cooperates with similar circuitry of the first control portion 12 to activate control function. In particular, activating of the control function is generally operable to control an on-screen function, such as navigation, jump, sprint, switch screens, etc., of a video game being played on a mobile device 5. The second control portion 13 includes one or more game controller inputs 24b, for example joystick 25b, triggers 27b, directional key pad 29b, battery control button 30b, etc. While some game controller inputs 24b are demonstrated in FIGS. 1-4D and 9-11, in some embodiments, one or more additional game controller inputs 24b known in the art can be incorporated in the second control portion 13, or omitted from the ones demonstrated in FIGS. 1-4D and 9-11.

The electrical circuitry 21b may include, in addition to, or alternative to, the electrical circuitry 21a of the first control portion 12, one or more communications modules (e.g., Bluetooth™, WI-FI, IEEE 802.11 compliant protocols) to facilitate communication of the game controller 11 with the mobile device 5. For example, the one or more communications channels may, for instance, include a communication network, which may be a wired connection, a Wi-Fi network, WiMAX, Zigbee, Z-Wave, Bluetooth™, Bluetooth™ Low Energy, near-field communication, or any other type of connection capable of providing uni-directional or bi-directional communication between the game controller 11 and the mobile device 5.

The first and second control portions 12, 13, are generally operable to be slideably moveable relative to a central axis 4 of the game controller 11. As described in more detail below, the first and second control portions 12, 13 can slideably translate to allow for the mobile device 5 to be received in, on, or around the charging unit 14. In particular, the first control portion 12 includes a receiving assembly 32a that slideably telescopically translates relative to the charging unit 14. The receiving assembly 32a includes a first bracket 33a, a first grip member 34a, and a first channel member 35a. The first bracket 33a has a generally C-shaped structural shape and profile. The first bracket 33a is sized and shaped to couple to the upper housing 16a. In particular, the upper housing 16a has a first recess region 36a that is sized and shaped to receive the first bracket 33a. An interior side 37a of the first bracket 33a includes a first grip cavity 38a that is sized and shaped to coupleably receive the first grip member 34a. The first grip member 34a has a generally C-shaped structural shape profile and is sized and shaped to receive the mobile device 5. In some embodiments, the first grip member 34a comprises rubber, plastics, or other materials. The first grip member 34a includes a plurality of axially spaced apart first grip recesses 39a. The first grip recesses 39a generally provide gripping ability to a mobile device 5 that is received therein.

The first channel member 35a has a generally rectangular shape and profile with arcuate end portions and is hollow to define a first internal cavity 40a. Upper and lower sides 41a, 42a of the first channel member 35a include respective first protrusions 43a, 44a. The first protrusions 43a are sized and shaped to be received in upper channel recesses 45a disposed in the upper housing 16a. The first protrusions 44a are sized and shaped to be received in lower channel recesses 46a disposed in the lower housing 17a. Each first protrusion 43a includes an upper channel 47a that extends the longitudinal length of the first channel member 35a. Similarly, each first protrusion 44a includes a lower channel 48a that extends the longitudinal length of the first channel member 35a. Each first protrusion 44a includes a first slot aperture 49a extending therethrough. One of the two first protrusions 44a includes first locking teeth 50a extending in a longitudinal direction from a first side flange 51a of one of the two first protrusions 44a. The first locking teeth 50a are sized and shaped to adjustably couple to a first locking member 52a of the first control portion 12.

The first locking member 52a includes a first coupling plate 53a, a first release bracket 54a, and a first locking bracket 55a. The first coupling plate 53a is fixedly coupled to the channel member 35a, and is positioned near or proximal to the first locking teeth 50a. The first coupling plate 53a includes a first bracket cavity 56a sized and shaped to slideably receive portions of the first release bracket 54a. In particular, the first release bracket 54a includes a first lower protrusion 63a that is sized and shaped to slideably move through the first bracket cavity 56a. An upper side of the first release bracket 54a includes a first release button 57a that protrudes outwardly therefrom. The first release button 57a is sized and shaped to protrude out of a first release cavity 58a disposed in the lower housing 17a. In particular, the first release button 57a slideably moves through the first release cavity 58a between a locking and a release position.

The first locking bracket 55a is coupled to the first coupling plate 53a. The first locking bracket 55a includes a first locking cavity 59a and first teeth 60a. The first locking cavity 59a is sized and shaped to slideably receive the first release bracket 54a. In particular, the first release bracket 54a slides into the first locking cavity 59a to lock the first control portion 12 and slides out of the first locking cavity 59a to unlock and/or release to first control portion 12. As the first release bracket 54a moves or slides out of the first locking cavity 59a, the first release bracket 54a moves through or in the first bracket cavity 56a until mating or abutting with a surface of the first coupling plate 53a. As the first locking bracket 55a moves or slides out, as described above, such moves the first control portion 12 to the release position or the unlock position. Moving or sliding the first locking bracket 55a into the first locking cavity 59a moves the first control portion 12 into the locked position.

The first teeth 60a are sized and shaped to couple to the first locking teeth 50a. Thus, when the first control portion 12 is slideably moved to a desired longitudinal position, the first teeth 60a couple to the first locking teeth 50a to lock the first control portion 12. In order to slideably move the first control portion 12, one may move the first control portion 12 to the unlocked/release position by moving the first release button 57a as described above. Once the first release bracket 54a is moved out of the first locking cavity 59a, a user may slideably move the first control portion 12 away from the central axis 4 of the game controller 11. As the first release bracket 54a is moved out of the first locking cavity 59a, the first locking bracket 55a may deformably move as the first teeth 60a uncouple from the first locking teeth 50a. When the first control portion 12 is moved to a desired position or location, the first teeth 60a couple to the first locking teeth 50a, and the first release button 57a can be moved to the locked position, which causes the first locking bracket 55a to move into the first locking cavity 59a, thereby preventing deformable movement of the first locking bracket 55a.

As described above, the second control portion 13 is generally similar to the first control portion 12. In particular, the second control portion 13 includes a receiving assembly 32b that slideably telescopically translates relative to the charging unit 14. The receiving assembly 32b includes a second bracket 33b, a second grip member 34b, and a second channel member 35b. The second bracket 33b has a generally C-shaped structural shape and profile. The second bracket 33b is sized and shaped to couple to the upper housing 16b. In particular, the upper housing 16b has a second recess region 36b that is sized and shaped to receive the second bracket 33b. An interior side 37b of the second bracket 33b includes a second grip cavity 38b that is sized and shaped to coupleably receive the second grip member 34b. The second grip member 34b has a generally C-shaped structural shape profile and is sized and shaped to receive the mobile device 5. In some embodiments, the second grip member 34b comprises rubber, plastics, or other materials. The second grip member 34b includes a plurality of axially spaced apart second grip recesses 39b. The second grip recesses 39b generally provide gripping ability to a mobile device 5 that is received therein.

The second channel member 35b has a generally rectangular shape and profile with arcuate end portions and is hollow to define a second internal cavity 40b. Upper and lower sides 41b, 42b of the second channel member 35b include respective second protrusions 43b, 44b. The second protrusions 43b are sized and shaped to be received in upper channel recesses 45b disposed in the upper housing 16b. The second protrusions 44b are sized and shaped to be received in lower channel recesses 46b disposed in the lower housing 17b. Each second protrusion 43b includes an upper channel 47b that extends the longitudinal length of the second channel member 35b. Similarly, each second protrusion 44b includes a lower channel 48b that extends the longitudinal length of the second channel member 35b. Each second protrusion 44b includes a second slot aperture 49b extending therethrough. One of the two second protrusions 44b includes second locking teeth 50b extending in a longitudinal direction from a second side flange 51b of one of the two second protrusions 44b. The second locking teeth 50b are sized and shaped to adjustably couple to a second locking member 52b of the second control portion 13.

The second locking member 52b includes a second coupling plate 53b, a second release bracket 54b, and second locking bracket 55b. The second coupling plate 53b is fixedly coupled to the second channel member 35b, and is positioned near or proximal to the second locking teeth 50b. The second coupling plate 53b includes a second bracket cavity 56b sized and shaped to slideably receive portions of the second release bracket 54b. In particular, the second release bracket 54b includes a second lower protrusion 63b that is sized and shaped to slideably move through the second bracket cavity 56b. An upper side of the second release bracket 54b includes a second release button 57b that protrudes outwardly therefrom. The second release button 57b is sized and shaped to protrude out of a second release cavity 58b disposed in the lower housing 17b. In particular, the second release button 57b slideably moves through the second release cavity 58b between a locking position and a release position.

The second locking bracket 55b is coupled to the second coupling plate 53b. The second locking bracket 55b includes a second locking cavity 59b and second teeth 60b. The second locking cavity 59b is sized and shaped to slideably receive the second release bracket 54b. In particular, the second release bracket 54b slides into the second locking cavity 59b to lock the second control portion 13 and slides out of the second locking cavity 59b to unlock and/or release to second control portion 13. As the second release bracket 54b moves or slides out of the second locking cavity 59b, the second release bracket 54b moves through or in the second bracket cavity 56b until mating or abutting with a surface of the second coupling plate 53b. As the second locking bracket 55b moves or slides out, as described above, such moves the second control portion 13 to the release or unlock position. Moving or sliding the second locking bracket 55b into the second locking cavity 59b moves the second control portion 13 into the locked position.

The second teeth 60b are sized and shaped to couple to the second locking teeth 50b. Thus, when the second control portion 13 is slideably moved to a desired longitudinal position, the second teeth 60b couple to the second locking teeth 50b to lock the second control portion 13. In order to slideably move the second control portion 13, one may move the second control portion 13 to the unlocked/release position by moving the second release button 57b as described above. Once the second release bracket 54b is moved out of the second locking cavity 59b, a user may slideably move the second control portion 13 away from the central axis 4 of the game controller 11. As the second release bracket 54b is moved out of the second locking cavity 59b, the second locking bracket 55b may deformably move as the second teeth 60b uncouple from the second locking teeth 50b. When the second control portion 13 is moved to a desired position or location, the second teeth 60b couple to the second locking teeth 50b, and the second release button 57b can be moved to the locked position, which causes the second locking bracket 55b to move into the second locking cavity 59b, thereby preventing deformable movement of the second locking bracket 55b.

The game controller 11 optionally includes the stand assembly 15. The stand assembly 15 generally operates to hold the mobile device 5. For example, a user may desire to position the mobile device 5 in the stand to allow for a viewing orientation where the user is facing the mobile device 5 without having to bend his/her neck. The optional stand assembly 15 is hingedly and removably coupled to the first and second control portions 12, 13. In particular, the stand assembly 15 includes a stand bracket 64 that is coupled to the first and second control portions 12, 13. As illustrated in FIGS. 1-11, the stand bracket 64 has a generally C-shaped structural shape and profile having stand side flanges 65a, 65b, and an end flange 66. The stand side flange 65a is coupled to the second control portion 13 and the stand side flange 65a is coupled to the first control portion 12. The end flange 66 includes hinge portions 67 that are sized and shaped to hingedly couple to portions of the stand assembly 15. In particular, the stand assembly 15 includes the stand side bracket 64, a hinge plate 68 having plate hinge portions 96 that are sized and shaped to couple to the hinge portions 67 of the end flange 66, an outer cover plate 69, a coupling bracket 70, a coupling plate 71, a first holding bracket 72, and a second holding bracket 73.

The coupling bracket 70 includes side bracket flanges 75a, 75b that are coupleably received in respective stand side flanges 65a, 65b. The coupling plate 71 couples to the stand bracket 64 to conceal or overlay the side bracket flanges 75a, 75b received in the stand side flanges 65a, 65b, and more generally, the coupling bracket 70 couples to the stand bracket 64. As described above, the hinge plate 68 includes plate hinge portions 96 that hingedly couple to the hinge portions 67 of the end flange 66. The plate hinge portions 96 and the hinge portions 67 both include pin apertures that are sized and shaped to receive one or more hinge pin(s) 74. A center of the hinge pin(s) 74 defines a pivot axis about which the hinge plate 68 pivotably and hingedly rotates relative to the hinge portions 67 of the end flange 66. The hinge plate 68 includes a web flange 77 that is sized and shaped to coupleably receive the first holding bracket 72 and the second holding bracket 73.

The first holding bracket 72 includes a first receiving flange 78 and a pair of first end flanges 79. The first receiving flange 78 is sized and shaped to hold a mobile device 5. The first end flanges 79 extend through the web flange 77 and are received in bracket portions 80 of the web flange 77. The second holding bracket 73 is generally operable to adjustably move relative to the first holding bracket 72 in order to securably receive mobile devices 5 having various sizes and shapes. The second holding bracket 73 includes a second receiving flange 81 and a second end flange 82. The second receiving flange 81 is sized and shaped to cooperate with the first receiving flange 78 to hold, secure, or retain the mobile device 5. The second end flange 82 extends adjacent to the web flange 77 and includes a spring recess 83 and a pair of posts 84. The pair of posts 84 are sized and shaped to coupleably receive a biasing device 85, e.g., one or more springs 86. The spring recess 83 is sized and shaped to receive the biasing device 85.

The outer cover plate 69 is sized and shaped to couple to the second holding bracket 73 and the hinge plate 68. When the outer cover plate 69 is coupled to the hinge plate 68, such defines an internal cavity for receiving the biasing device 85. The outer cover plate 69 includes a pair of channel members 87 through which the springs 86 of the biasing device 85 are guided. The outer cover plate 69 includes a pair of spring posts 89 that coupleably receive one end of each of the springs 86, and another end of each of the springs 86 is coupled to the posts 84 of the second end flange 82. In this manner, the second holding bracket 73 may be extended outwardly relative to the first holding bracket 72 by applying forces which overcome biasing forces of the biasing device 85 urging the second holding bracket 73 toward the first holding bracket 72.

In some implementations, the stand assembly 15 optionally includes one or more protective shield members 90. The one or more protective shield members 90 generally comprise rubber and are sized and shaped to protect the mobile device 5 from impact and/or damage. For example, one or more of the protective shield members 90 may be coupled to the web flange 77, the first holding bracket 72, and/or the second holding bracket 73. More specifically, the one or more protective shield members 90 are coupled to portions or components of the stand assembly 15 that will face and/or abut the mobile device 5.

The charging unit 14 includes a lower compartment 91 and an upper compartment 92. The lower compartment 91 includes a lower central member 93, a first lower rail 94a extending from the lower central member 93, and a second lower rail 94b extending from the lower central member 93. The upper compartment 92 includes an upper central member 95, a first upper rail member 97a extending from the upper central member 95, and a second upper rail member 97b extending from the upper central member 95. Each of the first and second upper rail members 97a, 97b include respective upper rail protrusions 98a. The upper rail protrusions 98a are sized and shaped to be received in the upper channels 47a of the first protrusions 43a and the upper channels 47b of the second protrusions 43b. Each of the first and second lower rail members 94a, 94b include respective lower protrusions 98b. The lower rail protrusions 98b are sized and shaped to be received in the lower channels 48a of the second protrusions 44a and the lower channels 48b of the second protrusions 44b. Each of the first and second lower rail members 94a, 94b includes corresponding fastening devices 101. The fastening devices 101 are sized and shaped to be slideably received in the first slot aperture 49a and the second slot apertures 49b. Thus, to extend or slideably move the first and second control portions 12, 13, a user may slide the first and second control portions 12, 13 away from the central axis 4. The first control portion 12 will slideably move via the upper channels 47a of the first protrusions 43a moving through the upper rail protrusions 98a and the lower channels 48a of the second protrusions 44a through the lower rail protrusions 98b. Similarly, the second control portion 13 will slideably move via the upper channels 47b of the first protrusions 43b moving through the upper rail protrusions 98a and the lower channels 48b of the second protrusions 44b through the lower rail protrusions 98b. The fastening devices 101 allow the slideable movement of the first and second control portions 12, 13 and act as guides via movement in the first and second slot apertures 49a, 49b and also act as a stop when the fastening devices 101 abut ends of the first and second slot apertures 49a, 49b.

When the lower compartment 91 is coupled to the upper compartment 92, such defines a central cavity 102. The central cavity 102 is sized and shaped to receive an inductive charging apparatus 103. The inductive charging apparatus 103 is generally operable to inductively charge any power storage device, for example, batteries, via, for example, inductive charging. The inductive charging apparatus 103 of the game controller 11, in general, forms a first charge interface that couples to a second charge interface of the mobile device 5. The second charge interface of the mobile device 5 may comprise a secondary winding and the first charging interface may comprise a primary winding, spaced sufficiently close together that passage of a current through the primary winding induces a current in the secondary winding. As described above, the power storage device may comprise batteries. Thus, the power storage device may comprise a battery 105 of the mobile device 5 that is charged via the inductive charging apparatus 103.

The inductive charging apparatus 103 includes a charging coil 104, for example, a primary winding of a first charge interface, a power source 106, charging electrical circuitry 107, and optional cover guard 108. The power source 106 is generally configured to provide power to charge the battery 105 of the mobile device 5 via inductive charging; for example, as described above, the charging coil 104 can form the first charging interface to inductively communicate with the second charging interface disposed in the mobile device 5 to charge the battery 105. The power source 106 can optionally comprise a charging battery 109, which provides the power source to inductively charge the battery 105 of the mobile device 5. In some implementations, the inductive charging apparatus 103 includes a port 110, such as, for example, a USB 3.0 A-type, B-Type, Micro or Mini, a 4-pin connector, or other type of connectors. In some implementations, the inductive charging apparatus 103 may include one or more ports which may comprise any of the USB 3.0 A-type, B-Type, Micro or Mini, a 4-pin connectors. The port 110 is generally operable to couple to an external power source to provide power to the power source 106, for example, the charging battery 109. Thus, via the external power source, the charging battery 109 may be charged.

The charging electrical circuitry 107, for example, mounted on one or more printed circuit boards (PCBs), one or more switches, one or more diodes, etc., forms a charging system 115 that transfers or delivers power from the external power source to charge the charging battery 109, and which charging battery 109 inductively communicates with the battery 105 of the mobile device 5 to charge the battery 105. In some implementations, the charging electrical circuitry 107 can directly inductively charge the battery 105 via power received via the external power source. In some implementations, the charging electrical circuitry 107 of the charging system 115 may communicate with power modules, charging modules, battery modules, or similar systems of the mobile device 5 (and associated electrical circuitry) to communicably receive information about a charge level of the battery 105. The charging electrical circuitry 107 of the charging system 115 may be activated to inductively charge the battery 105 based on the information about the charge level of the battery 105. For example, the charging system 115 may only be activated if the charge level of the battery 105 reaches a certain threshold percentage. For example, the charging system 115 may be activated if the threshold percentage is set to 50 percent. Thus, the charging system 115 may be activated if the charge level reaches falls below the threshold percentage of 50.

The charging system 115 can include a central controller, for example a microprocessor, digital signal processor, programmable gate array (PGA) or application specific integrated circuit (ASIC). The charging system 115 can include one or more non-transitory storage mediums, for example read only memory (ROM), random access memory (RAM), Flash memory, or other physical computer- or processor-readable storage media. The non-transitory storage mediums may store instructions and/or data used by the controller, for example an operating system (OS) and/or applications. The instructions as executed by the controller may execute logic to perform the functionality of the various embodiments described herein, including, but not limited to, logic to establish a pairing relationship with the mobile device 5.

In some embodiments or implementations, the charging system 115 may include a user interface, to allow an end user to operate or otherwise provide input to the game controller 11 regarding operation of the charging system. The user interface may include a number of user actuable controls accessible from the exterior of the game controller 11. For example, the user interface and may include a number of switches or keys operable to turn the charging system 115 ON and OFF and/or to set various operating parameters of the charging system 115. The user interface may also include one or more visual indicators, for instance light emitting diodes (LEDs). The visual indicators may be single color or may be capable of producing different color indicia corresponding to various operational states or conditions of the charging system 115.

Additionally, or alternatively, the user interface may include a display, for instance a touch panel display. The touch panel display (e.g., LCD with touch sensitive overlay) may provide both an input and an output interface for the end user. The touch panel display may present a graphical user interface, with various user selectable icons, menus, check boxes, dialog boxes, and other components and elements selectable by the end user to set operational states or conditions of the charging system 115. The user interface may also include one or more auditory transducers, for example one or more speakers and/or microphones. Such may allow audible alert notifications or signals to be provided to an end user. Such may additionally, or alternatively, allow an end user to provide audible commands or instructions. The user interface may include additional components and/or different components than those illustrated or described, and/or may omit some components. The switches and keys or the graphical user interface may, for example, include toggle switches, a keypad or keyboard, rocker switches, trackball, joystick or thumbstick. The switches and keys or the graphical user interface may, for example, allow an end user to turn ON the charging system 115, start or end a charging mode, select and/or deselect from a power source to charge the mobile device 5 battery 105, define a threshold charge level to activate charging, etc.

In some embodiments or implementations, the instructions and/or data stored on the non-transitory storage mediums that may be used by the controller of the charging system 115, such as, for example, ROM, RAM, and Flash memory, include or provide an application program interface ("API") that provides programmatic access to one or more functions of the charging system 115. For example, such an API may provide a programmatic interface to control one or more operational characteristics of the charging system 115. Such control may be invoked by one of the other programs, paired devices, or other remote device or system (not shown), or some other module. In this manner, the API may facilitate the development of third-party software, such as various different user interfaces and control systems for other devices, plug-ins, and adapters, and the like to facilitate interactivity and customization of the operation and devices within the charging system 115.

In an example embodiment or implementation, components or modules of the charging system 115 are implemented using standard programming techniques. For example, the logic to perform the functionality of the various embodiments or implementations described herein may be implemented as a "native" executable running on the controller, e.g., microprocessor, along with one or more static or dynamic libraries. In other embodiments, various functions of the charging system 115 may be implemented as instructions processed by a virtual machine that executes as one or more programs whose instructions are stored on ROM and/or random RAM. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the charging system 115, such as microprocessor, to perform the functions of the charging system 115. The instructions cause the microprocessor or some other processor, such as an I/O controller/processor, to process and act on information received to provide the functionality and operations of the charging system 115 described herein.

The embodiments or implementations described above may also use well-known or other synchronous or asynchronous client-server computing techniques. However, the various components may be implemented using more monolithic programming techniques as well such as, for example, an executable running on a single microprocessor, or alternatively decomposed using a variety of structuring techniques known in the art, including but not limited to, multiprogramming, multithreading, client-server, or peer-to-peer (e.g., Bluetooth®, NFC or RFID wireless technology, mesh networks, etc.), running on one or more computer systems each having one or more central processing units (CPUs) or other processors. Some embodiments may execute concurrently and asynchronously, and communicate using message passing techniques. Also, other functions could be implemented and/or performed by each component/module, and in different orders, and by different components/modules, yet still achieve the functions of the charging system 115.

In addition, programming interfaces to the data stored on and functionality provided by the charging system 115, can be available by standard mechanisms such as through C, C++, C#, and Java APIs; libraries for accessing files, databases, or other data repositories; scripting languages; or Web servers, FTP servers, or other types of servers providing access to stored data. The data stored and utilized by charging system 115 and overall ecosystem may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the charging system 115.

Furthermore, in some embodiments, some or all of the components of the charging system 115 and components of other devices within the inductive charging device 10, may be implemented or provided in other manners, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The cover guard 108 is coupled to the lower compartment 91. In some implementations, the cover guard 108 may be removably coupleable to the lower compartment 91. In general, the cover guard 108 is optionally coupled to the lower compartment 91 to protect or guard the mobile device 5 received in the charging unit 14.

Figure 9:
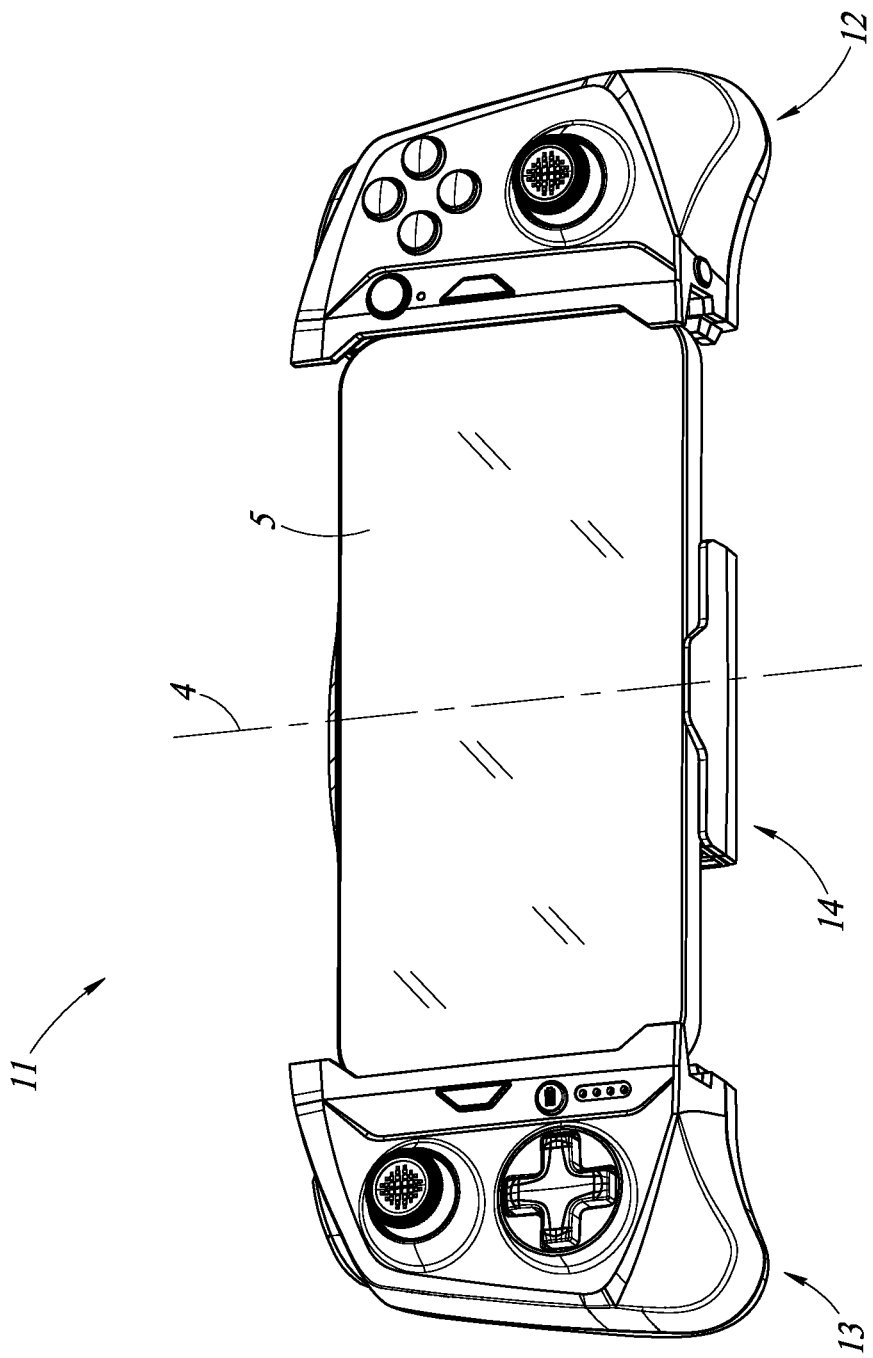
FIG. 9 is a skewed isometric view of the game controller of FIG. 1, illustrating the game controller in an extended configuration.
Figure 10:
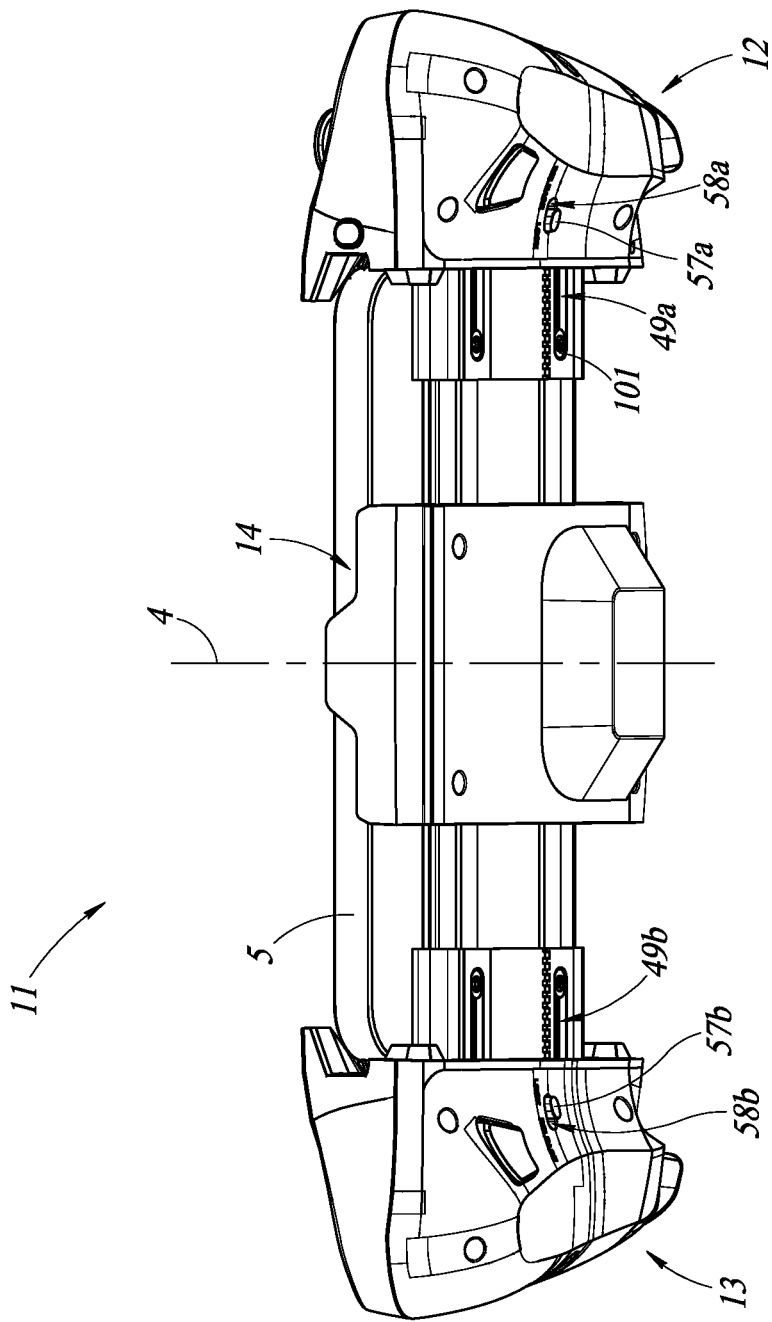
FIG. 10 is another skewed isometric view of the game controller of FIG. 1, illustrating the game controller in an extended configuration.
Figure 11:
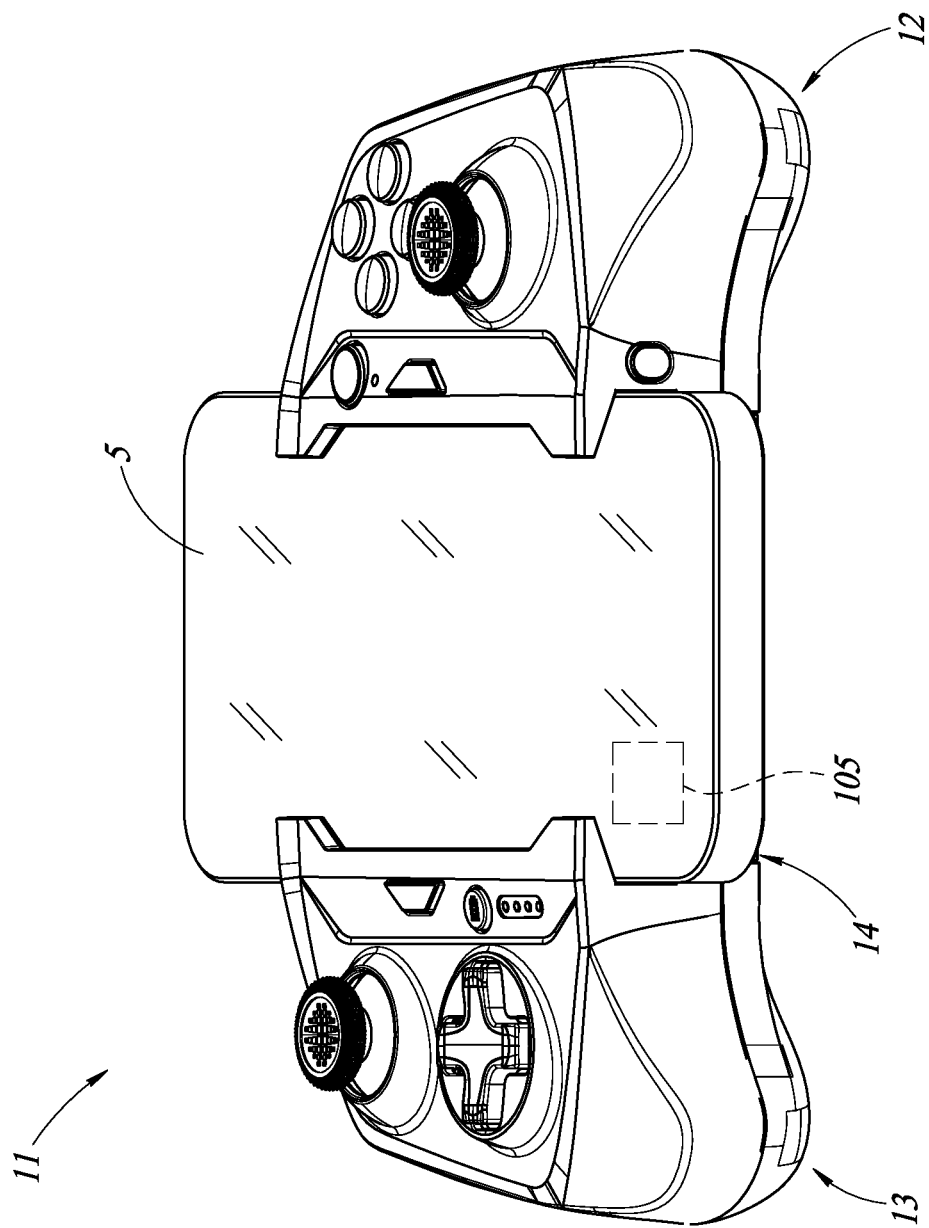
FIG. 11 is an isometric view of the game controller of FIG. 1, illustrated the game controller in a retracted configuration.

Thus, in operation, a user may inductively charge a mobile device 5 via the game controller 11. In particular, the game controller 11 is moveable between a retracted configuration and an extended configuration. For example, FIGS. 1 and 11 illustrate the game controller 11 in the retracted configuration. As described above, the first control portion 12 and the second control portion 13 are each, individually, or collectively, slideable, telescopically moveable to the extended configuration. For example, a user may move the first and/or second release buttons 57a, 57b to move the corresponding first and second release brackets 54a, 54b. As the first and/or second release brackets 54a, 54b are moved to their unlock positions, such allows the user to extend the corresponding first and/or second control portions 12, 13 away from the central axis 4 to the desired position or location. For example, FIGS. 9 and 10 illustrate the game controller 11 in an extended configuration, where both first control portion 12 and the second control portion 13 have been moved away from the central axis 4. After extending the first and/or second control portions 12, 13, the user may position the mobile device on the charging unit 14. In particular, one end of the mobile device 5 is positioned within the first bracket 33a and mates or abuts the first grip member 34a. Another end of the mobile device 5 is positioned within the second bracket 33b and mates or abuts the second grip member 34b. The user may thereafter move the first and/or second release buttons 57a, 57b to lock the respective first and second control portions 12, 13.

As described above, the first and second control portions 12, 13 include electrical circuitry 21a, 21b that allows the user to communicate with the mobile device 5, for example, wirelessly, to activate control function to control an on-screen function, such as navigation, jump, sprint, switch screens, etc. of a video game being played on a mobile device 5. As the mobile device 5 is positioned on or near the charging unit 14, the battery 105 of the mobile device 5 may be selectively charged via inductive charging.

For example, the charging system 115 formed by the charging electrical circuitry 107, may be configured to directly inductively charge the battery 105 via power received via the external power source. In some implementations, the charging electrical circuitry 107 of the charging system 115 may communicate with power modules, charging modules, battery modules, or similar systems of the mobile device 5 (and associated electrical circuitry) to communicably receive information about a charge level of the battery 105. The charging system 115 may be activated to inductively charge the battery 105 based on the information about the charge level of the battery 105. For example, the charging system may only be activated if the charge level of the battery 105 reaches a certain threshold percentage. For example, the charging system may be activated if the threshold percentage is set to 50 percent. Thus, the charging system may be activated if the charge level falls below the threshold percentage of 50. In some implementations, the charging system 115 may be operable to deactivate the charging unit 14 once the charge level of the battery 105 reaches a certain threshold charge percentage. For example, the charging unit 14 may not inductively charge the battery 105 when the charge level of the battery 105 exceeds any threshold percentage between 70 to 100 percent. In some implementations, the charging system 115 may be operable to alternate between delivering power to charge the battery 105 from the external power source and the charging battery 109. For example, the charging battery 109 may deliver power until the charge level of the battery 105 reaches a certain threshold. Upon reaching that certain threshold, the charging system 115 may switch power supply to be received from the external power source.

While FIGS. 9 and 10 illustrate the mobile device 5 being positioned in a horizontal orientation, in other embodiments, the game controller 11 can receive the mobile device 5 in a vertical orientation. For example, as described above, the stand unit 15 is optional and may be removably decoupled from the first and second control portions 12, 13. Similarly, the cover guard 108 is optional and may be removably decoupled from the compartment 91. In such a configuration, as illustrated in FIG. 11, the mobile device 5 can be oriented in a vertical direction. For example, the first and control portions 12, 13 may be slideably moved to receive the mobile device 5 oriented in the vertical direction by moving the first and second release buttons 57a, 57b to the unlock positions as described above. Once the mobile device 5 is received in, on, or around the charging unit 14, the first and second control portions 12, 13 may be moved to the retracted configuration illustrated in FIG. 1, and the first and second release buttons 57a, 57b may be moved to the locked positions.

Moreover, the various embodiments described above can be combined to provide further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A game controller communicably coupled to a mobile device having a power source, the game controller having a retracted configuration and an extended configuration, the game controller comprising:
   a first control portion having one or more game controller inputs;
   a second control portion have one or more game controller inputs; and
   a charging unit coupleable to the first control portion and the second control portion, the charging unit having:
      a region that is sized and shaped to receive the mobile device, and
      an inductive charging apparatus, the inductive charging apparatus operable to selectively inductively charge the power source of the mobile device when the mobile device is received in the region;
   wherein the first control portion is slidably movable relative to the charging unit.

2. The game controller of claim 1, wherein the charging unit includes:
   a lower compartment; and an upper compartment coupleable to the lower compartment to define an interior cavity, the interior cavity sized and shaped to house components of the charging unit.

3. The game controller of claim 1, wherein the charging unit includes a primary winding and a charging battery, the charging battery operable to supply power to inductively charge the power source of the mobile device.

4. The game controller of claim 1, wherein the first control portion is slideably moveable relative to the charging unit in a first direction away from a central axis of the game controller when the game controller moves between the retracted configuration and the extended configuration.

5. The game controller of claim 4, wherein the second control portion is slideably moveable relative to the charging unit in a second direction away from the central axis of the game controller when the game controller moves between the retracted configuration and the extended configuration, the second direction being opposite of the first direction.

6. The game controller of claim 1, wherein each of the first and second control portions are slideably moveable relative to the charging unit when the game controller switches between the retracted configuration and the extended configuration, the game controller in the extended configuration, sized and shaped to receive the mobile device in the region in a first orientation, and the game controller in the retracted configuration, sized and shaped to receive the mobile device in the region in a second orientation that is different from the first orientation.

7. The game controller of claim 1, wherein the charging unit includes a first rail that is sized and shaped to slideably couple to the first control portion, and a second rail that is sized and shaped to slideably couple to the second control portion.

8. The game controller of claim 7, wherein:
the first rail includes a first protrusion;
the second rail includes a second protrusion;
the first control portion includes a first channel that is sized and shaped to slideably receive the first protrusion of the first rail; and
the second control portion includes a second channel that is sized and shaped to slideably receive the second protrusion of the second rail.

9. The game controller of claim 1, wherein the first control portion includes a first receiving assembly that slideably telescopically translates relative to the charging unit, and the second control portion includes a second receiving assembly that slideably telescopically translates relative to the charging unit.

10. The game controller of claim 9 wherein the first and second receiving assemblies each include:
a bracket;
a grip member; and
a channel member, the channel member having a cavity that is sized and shaped to receive a rail of the charging unit.

11. The game controller of claim 1, further comprising a stand assembly, the stand assembly including:
a first holding bracket; and
a second holding bracket, the first and second holding brackets sized and shaped to define a holding region that secures the mobile device.

12. The game controller of claim 11 wherein the stand assembly is hingedly coupled to the first control portion and the second control portion.

13. The game controller of claim 11 wherein the second holding bracket is adjustable moveable relative to the first holding bracket.

14. A charging unit coupleable to a game controller and operable to selectively charge a battery of a mobile device coupled to the game controller, the charging unit comprising:
a housing compartment including a first side and a second side opposite to the first side;
a first rail extending outwardly from the first side of the housing compartment, the first rail sized and shaped to couple to the game controller;
a second rail extending outwardly from the second side of the housing compartment, the second rail sized and shaped to couple to the game controller; and
an inductive charging apparatus received in the housing compartment, the inductive charging apparatus operable to selectively inductively charge the battery of the mobile device when the mobile device is positioned proximal to the inductive charging apparatus.

15. The charging unit of claim 14, wherein the inductive charging apparatus includes a first charge interface that inductively communicates with a secondary charge interface disposed in the mobile device.

16. The charging unit of claim 15, wherein the first charge interface comprises a primary charging coil, and the second charge interface comprises a secondary charging coil.

17. The charging unit of claim 14, wherein the inductive charging apparatus includes a power source that is operable to deliver power to selectively inductively charge the battery of the mobile device.

18. The charging unit of claim 17 wherein the power source includes at least one of a charging battery or an external power source.

19. The charging unit of claim 14 wherein the charging unit includes a cover guard, the cover guard sized and shaped to secure the mobile device.

20. The charging unit of claim 14 wherein:
the first rail includes a first protrusion;
the second rail includes a second protrusion;
the game controller includes a first channel that is sized and shaped to slideably receive the first protrusion of the first rail; and
the game controller includes a second channel that is sized and shaped to slideably receive the second protrusion of the second rail.

21. A charging unit coupleable to a game controller and operable to selectively charge a battery of a mobile device coupled to the game controller, the charging unit comprising:
a housing compartment;
a first rail extending outwardly from the housing compartment, the first rail sized and shaped to couple to the game controller, the first rail includes a first protrusion;
a second rail extending outwardly from the housing compartment, the second rail sized and shaped to couple to the game controller, the second rail includes a second protrusion; and
an inductive charging apparatus received in the housing compartment, the inductive charging apparatus operable to selectively inductively charge the battery of the mobile device when the mobile device is positioned proximal to the inductive charging apparatus, and
wherein the game controller includes a first channel that is sized and shaped to slideably receive the first protrusion of the first rail, and the game controller includes a second channel that is sized and shaped to slideably receive the second protrusion of the second rail.

* * * * *